United States Patent
Inoue

(10) Patent No.: US 10,885,499 B2
(45) Date of Patent: Jan. 5, 2021

(54) APPARATUS, SYSTEM, AND METHOD FOR MANAGING PRESENTATION, AND RECORDING MEDIUM

(71) Applicant: Yuichi Inoue, Kanagawa (JP)

(72) Inventor: Yuichi Inoue, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1011 days.

(21) Appl. No.: 15/205,096

(22) Filed: Jul. 8, 2016

(65) Prior Publication Data
US 2017/0011358 A1  Jan. 12, 2017

(30) Foreign Application Priority Data

Jul. 9, 2015 (JP) .................. 2015-137824
May 20, 2016 (JP) .................. 2016-101305

(51) Int. Cl.
*G06Q 10/10* (2012.01)
*G06F 3/0484* (2013.01)

(52) U.S. Cl.
CPC ....... *G06Q 10/1097* (2013.01); *G06F 3/0484* (2013.01); *G06Q 2230/00* (2013.01)

(58) Field of Classification Search
CPC .................. G06Q 10/1097; G06Q 2230/00
See application file for complete search history.

(56) References Cited

U.S. PATENT DOCUMENTS

| | | | | |
|---|---|---|---|---|
| 6,657,543 B1 * | 12/2003 | Chung | ............ | G06K 17/00 340/573.1 |
| 7,508,308 B2 * | 3/2009 | Chung | ............ | G06Q 10/08 340/572.1 |
| 2001/0041994 A1 * | 11/2001 | Kim | ............ | G06Q 10/02 705/5 |
| 2002/0123924 A1 * | 9/2002 | Cruz | ............ | G06Q 10/06314 705/7.24 |
| 2002/0174429 A1 * | 11/2002 | Gutta | ............ | H04N 5/44543 725/46 |

(Continued)

FOREIGN PATENT DOCUMENTS

| | | |
|---|---|---|
| CN | 101103371 A | 1/2008 |
| JP | 2007-257035 | 10/2007 |
| JP | 2008-077539 | 4/2008 |

OTHER PUBLICATIONS

Salvatore Cuomo et al, Visitor Dynamics in a Cultural Heritage Scenario, 4th International Conference on Data Management Technologies and Applications (KomIS-2015), pp. 337-343 (Year: 2015).*

(Continued)

*Primary Examiner* — Andre D Boyce
(74) *Attorney, Agent, or Firm* — Oblon, McClelland, Maier & Neustadt, L.L.P.

(57) ABSTRACT

A presentation management server analyzes vote information, selects an exhibit to be recommended for presentation based on analysis of the vote information, determines a recommended presentation time for having a presentation on the selected exhibit based on the presentation schedule information, and generates a presentation recommendation screen including a recommendation to have a presentation on the selected exhibit at the recommended presentation time for output through an exhibitor terminal operated by an exhibitor of the selected exhibit.

17 Claims, 28 Drawing Sheets

(56) References Cited

U.S. PATENT DOCUMENTS

| | | | |
|---|---|---|---|
| 2003/0211856 A1* | 11/2003 | Zilliacus | G06Q 10/10 455/466 |
| 2006/0155602 A1* | 7/2006 | Durbin | G06Q 30/00 705/14.56 |
| 2007/0112689 A1* | 5/2007 | Brown | G06Q 30/00 705/319 |
| 2007/0233548 A1 | 10/2007 | Okawa | |
| 2008/0228544 A1* | 9/2008 | Woosley | G06Q 10/1095 705/7.19 |
| 2008/0235111 A1* | 9/2008 | Dotan | G06F 16/9535 705/26.1 |
| 2013/0137078 A1* | 5/2013 | Shustorovich | G09B 7/00 434/362 |
| 2013/0174055 A1* | 7/2013 | Johnson | H04N 21/4758 715/753 |
| 2014/0176665 A1* | 6/2014 | Gottlieb | H04N 7/15 348/14.08 |
| 2014/0351026 A1* | 11/2014 | Merel | G07C 13/00 705/12 |
| 2015/0190726 A1* | 7/2015 | Frolov | A63F 13/837 472/61 |
| 2016/0011733 A1* | 1/2016 | Mann | G06F 3/0484 715/709 |
| 2016/0048519 A1* | 2/2016 | Chuah | G06Q 30/02 707/733 |
| 2016/0189461 A1* | 6/2016 | Kanon | H04L 9/008 705/51 |

OTHER PUBLICATIONS

Combined Chinese Office Action and Search Report dated Jan. 31, 2019 in Patent Application No. 201610478150.2.

* cited by examiner

FIG. 5

VISITOR DB

| VISITOR ID | PRESENT |
|---|---|
| C@mail | YES |
| D@mail | NO |
| E@mail | YES |
| ⋮ | ⋮ |

FIG. 6

EXHIBIT DB

| EXHIBIT ID | EXHIBITOR EMAIL ADDRESS | EXHIBIT ITEM | EXHIBIT URL | EXHIBIT PLACE |
|---|---|---|---|---|
| P1 | S1@mail | A | URL1 | S BOOTH |
| P2 | S2@mail | B | URL2 | S BOOTH |
| ⋮ | ⋮ | ⋮ | ⋮ | ⋮ |
| Q1 | T1@mail | C | URL3 | T BOOTH |
| ⋮ | ⋮ | ⋮ | ⋮ | ⋮ |
| R1 | R1@mail | D | URL4 | U BOOTH |
| ⋮ | ⋮ | ⋮ | ⋮ | ⋮ |

FIG. 8

VOTE DATA DB

| VISITOR ID | EXHIBIT ID | VOTE DATE/TIME |
|---|---|---|
| C@mail | Q1 | 2014/10/10 10:32 |
| E@mail | Q1 | 2014/10/10 11:06 |
| ⋮ | ⋮ | ⋮ |

FIG. 9

LOGIN MANAGEMENT DB

| VISITOR ID | LOGIN CONFIRMATION URL | URL VALID EXPIRATION DATE/TIME | LAST ACCESS DATE/TIME |
|---|---|---|---|
| C@mail | http://xxx | 2014/10/11 23:59 | – |
| E@mail | http://yyy | 2014/10/10 23:59 | 2014/10/10 9:39 |
| ⋮ | ⋮ | ⋮ | ⋮ |

FIG. 13

VOTE COLLECTION DB

| EXHIBIT ID | TOTAL VOTES | TOTAL VOTES RANK | LAST UPDATE | LAST VOTES | LAST RANK | DIFFERENCE IN VOTE | DIFFERENCE RANK | VOTES OF VISITOR PRESENT | RANK (VISITOR PRESENT) | DIFFERENCE IN VOTE (VISITOR PRESENT) | DIFFERENCE RANK (VISITOR PRESENT) |
|---|---|---|---|---|---|---|---|---|---|---|---|
| P1 | 50 | 4 | 11:00 | 48 | 4 | (+2) | 5 | 5 | 5 | 1 | 5 |
| P2 | 45 | 5 | 11:00 | 10 | 5 | (+35) | 2 | 20 | 4 | 17 | 2 |
| ... | ... | ... | ... | ... | ... | ... | ... | ... | ... | ... | ... |
| Q1 | 250 | 1 | 11:00 | 240 | 1 | (+10) | 3 | 25 | 2 | 6 | 4 |
| Q2 | 200 | 2 | 11:00 | 108 | 2 | (+92) | 1 | 156 | 1 | 82 | 1 |
| ... | ... | ... | ... | ... | ... | ... | ... | ... | ... | ... | ... |
| R1 | 58 | 3 | 11:00 | 49 | 3 | (+9) | 4 | 23 | 3 | 8 | 3 |
| ... | ... | ... | ... | ... | ... | ... | ... | ... | ... | ... | ... |

FIG. 15

EXHIBITION HALL DATA DB

| HALL NAME | SEATING CAPACITY | PLACE |
|---|---|---|
| M | 50 | PUBLIC |
| N | 10 | U BOOTH |
| O | 30 | PUBLIC |
| ... | ... | ... |

FIG. 16

PRESENTATION SCHEDULE DB

| | 10:00– | 11:00– | 12:00– | 13:00– | 14:00– | 15:00– | 16:00– | 17:00– |
|---|---|---|---|---|---|---|---|---|
| EXHIBITION HALL M | 10:00–10:45 EXHIBIT R3 | 11:00–11:45 EXHIBIT P2 | 12:00–12:45 EXHIBIT R3 | | 14:00–14:45 EXHIBIT R2 | | | |
| EXHIBITION HALL N | | | | 13:00–13:45 EXHIBIT R5 | | 15:00–15:45 EXHIBIT R6 | | |
| EXHIBITION HALL O | | 11:00–11:45 EXHIBIT P16 | | | | 15:00–15:45 EXHIBIT R7 | 16:00–16:45 EXHIBIT Q2 | |

FIG. 23

VOTE COLLECTION DB (BY TIME)

| EXHIBIT | 9:00– | 10:00– | 11:00– | 12:00– | 13:00– | 14:00– | 15:00– | 16:00– |
|---|---|---|---|---|---|---|---|---|
| P1 | 12 | 36 | 2 | . | . | . | . | . |
| P2 | 1 | 3 | 20 | . | . | . | . | . |
| ... | ... | ... | ... | ... | ... | ... | ... | ... |
| Q1 | 63 | 177 | 10 | . | . | . | . | . |
| Q2 | 50 | 58 | 92 | . | . | . | . | . |
| ... | ... | ... | ... | ... | ... | ... | ... | ... |
| R1 | 5 | 35 | 9 | . | . | . | . | . |
| ... | ... | ... | ... | ... | ... | ... | ... | ... |

FIG. 25

CHARGE DATA DB

| EXHIBITOR NAME | CHARGE FEE |
|---|---|
| P | 85000 Yen |
| Q | 185000 Yen |
| Q | 100000 Yen |
| ⋮ | ⋮ |

FIG. 27

EXHIBIT DB

| EXHIBIT ID | EXHIBITOR EMAIL ADDRESS | EXHIBITOR | EXHIBIT ITEM | EXHIBIT URL | EXHIBIT PLACE |
|---|---|---|---|---|---|
| P1 | S1@mail | P | A | URL1 | S BOOTH |
| P2 | S2@mail | P | B | URL2 | S BOOTH |
| ... | ... | ... | ... | ... | ... |
| Q1 | T1@mail | Q | C | URL3 | T BOOTH |
| ... | ... | ... | ... | ... | ... |
| R1 | R1@mail | R | D | URL4 | U BOOTH |
| ... | ... | ... | ... | ... | ... |

FIG. 28

EXHIBITION HALL DATA DB

| HALL NAME | SEATING CAPACITY | PLACE | CHARGE FEE |
|---|---|---|---|
| M | 50 | PUBLIC | 100000 Yen |
| N | 10 | U BOOTH | 30000 Yen |
| O | 30 | PUBLIC | 85000 Yen |
| ... | ... | ... | ... |

FIG. 31

| | 10:00– | 11:00– | 12:00– | 13:00– | 14:00– | 15:00– | 16:00– | 17:00– |
|---|---|---|---|---|---|---|---|---|
| EXHIBITION HALL M | | 11:00–11:45 EXHIBIT P2 39 SEATS | 12:00–12:45 EXHIBIT R3 31 SEATS | 13:00–13:45 EXHIBIT Q2 50 SEATS | 14:00–14:45 EXHIBIT R2 | | | |
| EXHIBITION HALL N | 10:00–10:45 EXHIBIT R3 7 SEATS | | | 13:00–13:45 EXHIBIT R5 10 SEATS | | 15:00–15:45 EXHIBIT R6 | | |
| EXHIBITION HALL O | | 11:00–11:45 EXHIBIT P16 30 SEATS | | 13:00–13:45 EXHIBIT Q1 15 SEATS | | 15:00–15:45 EXHIBIT R7 | | |

APPARATUS, SYSTEM, AND METHOD FOR MANAGING PRESENTATION, AND RECORDING MEDIUM

CROSS-REFERENCE TO RELATED APPLICATIONS

This patent application is based on and claims priority pursuant to 35 U.S.C. § 119(a) to Japanese Patent Application Nos. 2015-137824, filed on Jul. 9, 2015, and 2016-101305, filed on May 20, 2016, in the Japan Patent Office, the entire disclosure of which is hereby incorporated by reference herein.

BACKGROUND

Technical Field

The present invention generally relates to an apparatus, system, and method for managing presentation, and a recording medium.

Description of the Related Art

At the exhibition, each exhibitor attending the exhibition presents an exhibit on a booth, or gives presentation such as demonstration on the exhibit according to a presentation schedule. Recently, the exhibition may be provided with a management server, which collects a vote from each visitor, as the visitor votes the exhibit of interest by reading such as an IC tag attached to the exhibit. The management server can then analyze the collected votes to find out the needs from the visitors at the exhibition.

SUMMARY

The present inventor has realized that, while the above-described management server is able to output analysis of the collected votes, it has been difficult to organize the exhibition in a manner to reflect the needs from the visitors based on analysis. For example, even if the organizer of the exhibition finds out that a reasonable number of visitors have interests on a certain exhibit based on analysis of the collected votes, the exhibition organizer has no tool to effectively recommend an exhibitor to schedule a presentation on such exhibit, or announce such newly scheduled presentation to the visitors.

In view of the above, example embodiments of the present invention include an apparatus, system, and method for managing presentation on a plurality of exhibits at an exhibition, and a recording medium storing a control program for managing presentation.

In some embodiments, a presentation management server analyzes vote information, which indicates, for each one of the plurality of exhibits at the exhibition, a plurality of votes that has been collected for the exhibit from a plurality of visitors who has voted the exhibit, each vote being input at a visitor terminal operated by each visitor. The presentation management server selects, from among the plurality of exhibits at the exhibition, an exhibit to be recommended for presentation based on analysis of the vote information, determines a recommended presentation time for having a presentation on the selected exhibit based on presentation schedule information, and generates a presentation recommendation screen including a recommendation to have a presentation on the selected exhibit at the recommended presentation time for output through an exhibitor terminal operated by an exhibitor of the selected exhibit.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is an illustration of an example data structure of a visitor database;

FIG. 6 is an illustration of an example data structure of an exhibit database;

FIG. 8 is an illustration of an example data structure of a vote data database;

FIG. 9 is an illustration of an example data structure of a login management database;

FIG. 13 is an illustration of an example data structure of a vote collection database;

FIG. 15 is an illustration of an example data structure of an exhibition hall data database;

FIG. 16 is an illustration of an example data structure of a presentation schedule database;

FIG. 23 is an illustration of an example data structure of a time-based vote collection database;

FIG. 25 is an illustration of an example data structure of a charge data database;

FIG. 27 is an illustration of an example data structure of an exhibit database;

FIG. 28 is an illustration of an example data structure of an exhibition hall data database;

FIG. 31 is an illustration of an example data structure of a presentation schedule database;

Figure 1:
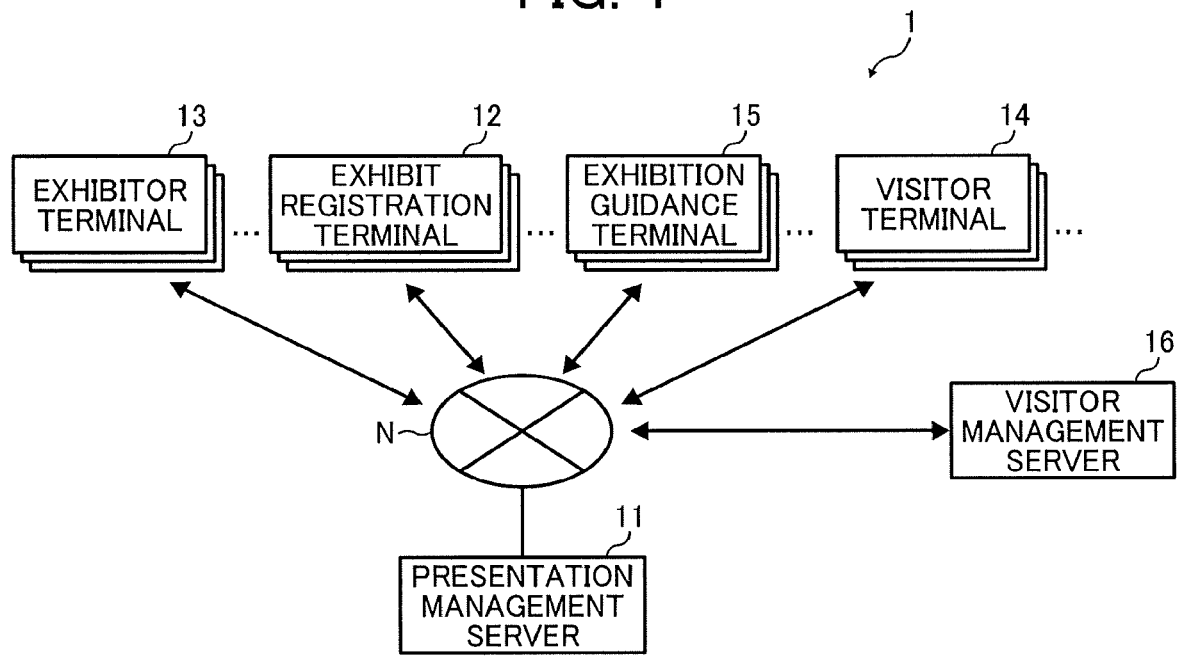
FIG. 1 is a schematic diagram illustrating a configuration of a presentation management system including a presentation management server, according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

The following describes some example cases where a plurality of exhibitors participate to present products, technologies, or services (called, exhibit) at exhibition booths. In this example, the exhibitor corresponds to an organization such as a company selling the exhibit, or any person on behalf of that organization. Further, the exhibitor may have a presentation to explain about the exhibit, according to a presentation schedule. In this disclosure, examples of the presentation include a discussion, panel discussion, lecture, and demonstration, and examples of the exhibition include a trade show, event, fair, and exposition.

Figure 32:
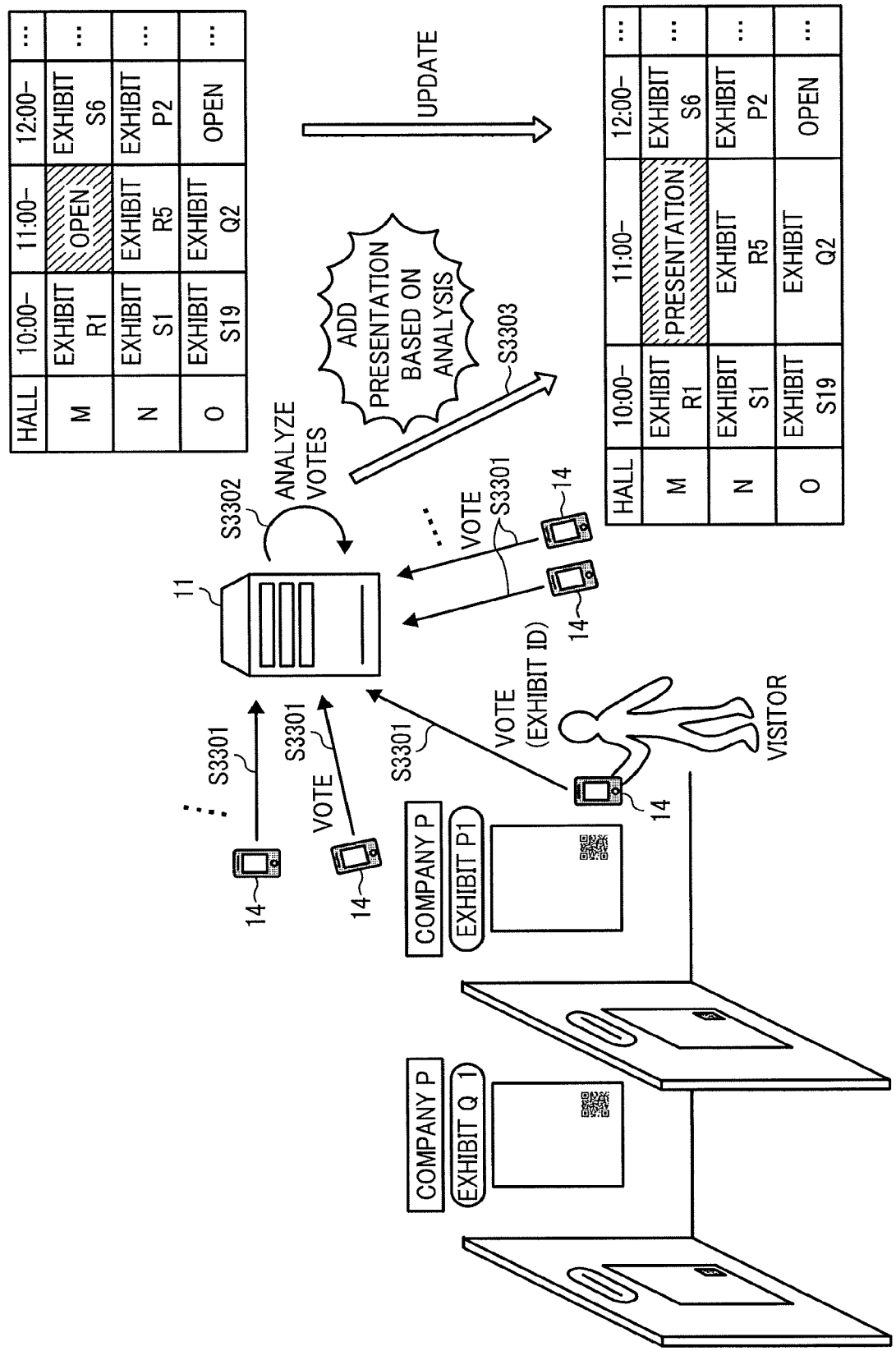
FIG. 32 is an illustration for explaining for managing a presentation schedule, performed by a presentation management system, according to an embodiment of the present invention.
Figure 33:
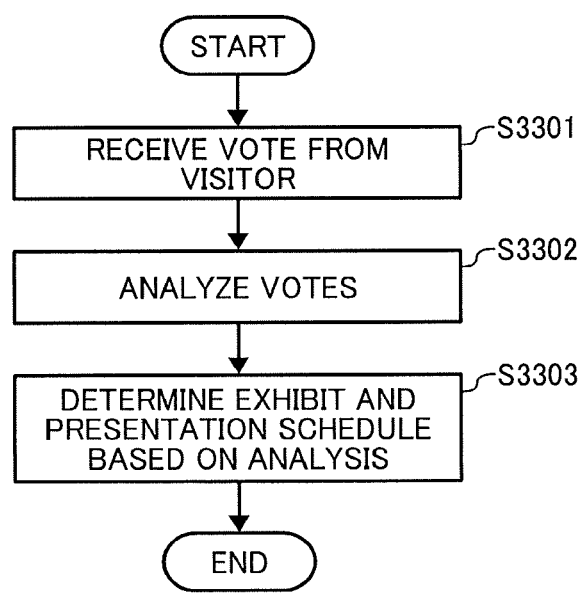
FIG. 33 is a flowchart illustrating operation of managing a presentation schedule, according to an embodiment of the present invention.

Referring to FIG. 1 and FIGS. 32 and 33, a concept of managing a presentation schedule with a presentation management system 1 is described according to an embodiment of the present invention.

FIG. 1 illustrates a configuration of a presentation management system 1 of the present embodiment. The presentation management system 1 includes a presentation management server 11, an exhibit registration terminal 12, an exhibitor terminal 13, a visitor terminal 14, an exhibition guidance terminal 15, and a visitor management server 16, which are connected through a network N such as a wide area network (WAN). In this embodiment, the network N may be any type of network such as wired or wireless.

Referring to FIGS. 32 and 33, operation of managing a presentation schedule, performed by the presentation management system 1, is described according to an embodiment of the present invention. FIG. 32 is an illustration for explaining operation of managing a presentation schedule with the presentation management system 1. FIG. 33 is a flowchart illustrating operation of managing a presentation schedule, performed by the presentation management system 1, according to the embodiment.

As illustrated in FIG. 32, the visitor, who visits an exhibition, carries the visitor terminal 14 (such as a mobile terminal) with him/her. In case the visitor gets interested in a particular exhibit, the visitor votes that exhibit. More specifically, the visitor terminal 14 reads a barcode attached to that exhibit or an information sheet explaining that exhibit, and transmits the read barcode to the presentation management server 11.

Accordingly, at S3301 of FIG. 33, the presentation management server 11 receives a vote for the exhibit from each one of one or more visitor terminals 14. At S3302, the presentation management server 11 analyzes the votes that are received from the visitor terminals 14.

The presentation management server 11 manages a presentation schedule, which indicates, for each presentation that has been scheduled, a time for presentation and a place where that presentation takes place, etc. As illustrated in FIG. 32, there may be a period of time with no presentation being scheduled ("OPEN" in FIG. 32). At S3303, based on the analysis, the presentation management server 11 determines an exhibit to be presented, for that time. For example, when an exhibition hall "M" is available for the time 11:00-12:00, and the analysis indicates that the exhibit P1 has the highest number of votes from the visitors, the presentation management server 11 recommends the exhibitor of the exhibit P1 to give a presentation at that time, for example, through sending an email or using the push notification of application. In response to receiving a response accepting the recommendation, the presentation management server 11 adds a new presentation schedule at that time 11:00-12:00, which indicates to give a presentation on the exhibit P1 at the exhibition hall M.

Referring to FIGS. 1 to 23, operation of managing a presentation schedule, performed by the presentation management system 1, is described below according to an embodiment of the present invention.

Figure 11:
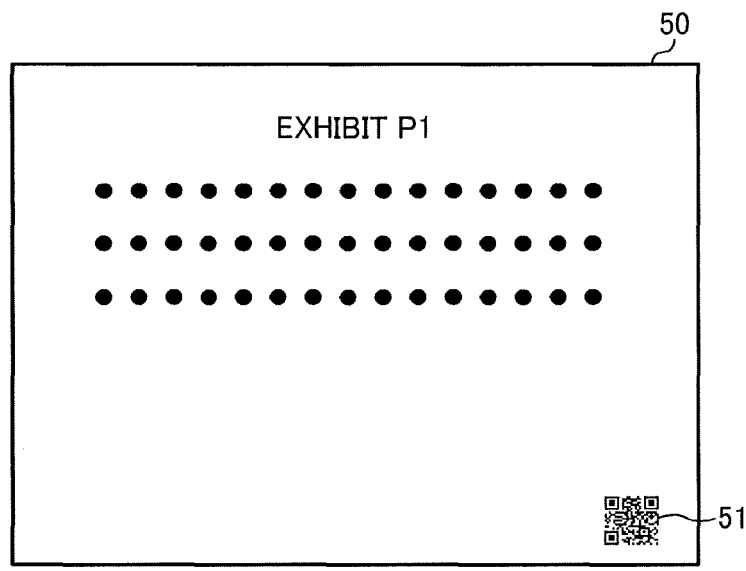
FIG. 11 is an illustration of an information sheet explaining an example registered exhibit, attached with a barcode.

Referring to FIG. 1, the exhibit registration terminal 12 is implemented by a personal computer (PC), or a mobile terminal such as a mobile phone or a smart device. The exhibit registration terminal 12 sends to the presentation management server 11 a request for registering at least one exhibit to be presented at the exhibition. In response to the request for registration, the presentation management server 11 sends a response to the exhibit registration terminal 12 data of a barcode or a near-field radio communication (NFC) tag to be attached to the registered exhibit. More specifically, the data of barcode or NFC tag is embedded with an exhibit ID for identifying the registered exhibit and/or an exhibition URL allowing a visitor to vote for the exhibit. Based on the data of barcode or NFC tag, a staff member at the exhibition outputs the barcode or NFC tag with a printer, and attaches the barcode or NFC tag onto the exhibit, for example, as illustrated in FIG. 11. The barcode may be one-dimensional or two-dimensional, as long as the barcode is readable by a general-purpose computer such as the visitor terminal 14. Examples of the two-dimensional barcode include, but not limited to, QR Code (Registered Trademark) and Data Matrix. In this disclosure, for simplicity, the barcode and the NFC tag may be collectively referred to as the barcode.

In this embodiment, the exhibitor or staff member may register the exhibit using a web browser generally-installed on a general-purpose computer, or dedicated application such as program for assisting an exhibitor to prepare for exhibition. When using the dedicated application, the exhibit registration terminal 12 does not have to receive data of barcode or NFC tag from the presentation management server 11. In such case, the exhibit registration terminal 12 may receive an exhibit ID identifying the registered exhibit, or an exhibition URL allowing a vote to the exhibit, from the presentation management server 11. The exhibit registration terminal 12 then converts the exhibit ID or the exhibition URL to have a data format such that it can be embedded into the data of barcode or NFC tag, using the dedicated application.

The visitor terminal 14 is implemented by a mobile terminal such as a mobile phone or a smart phone, which may be carried by a visitor who visits the exhibition. As the visitor enters the exhibition, the visitor terminal 14 carried by the visitor notifies the visitor management server 16 of his or her visit through the network N. When the visitor finds an exhibit of interest, the visitor operates the visitor terminal 14 to read a barcode on the exhibit of interest. The visitor terminal 14 votes the exhibit of interest, using information obtained from the read barcode, through sending information indicating vote for the specific exhibit, to the presentation management server 11 through the network N.

In this embodiment, the visitor may vote using a web browser, or dedicated application for assisting the visitor at the exhibition ("visitor assist system"). The visitor may download the dedicated application to install such application onto the visitor terminal 14 at any desired time, for example, when previously registering for the exhibition, when entering the exhibition, or when the user firstly votes for exhibit.

The visitor management server 16 is implemented by an information processing apparatus such as the PC. The visitor management server 16 receives a notification indicating entry or exit of the visitor, from the visitor terminal 14. Based on the received notification, the visitor management server 16 manages a current state of each visitor, which indicates whether the visitor is at the exhibition or not, and sends a notification indicating the presence of each visitor to the presentation management server 11.

For example, a barcode embedded with a URL for accessing the visitor management server 16 may be placed near entrance/exit of the exhibition. By requesting each visitor to read that barcode with the visitor terminal 14, information indicating presence of each visitor can be updated. The visitor terminal 14, which reads the barcode with the URL of the visitor management server 16, accesses the URL of the visitor management server 16, to automatically transmit a notification indicating entry or exit to the visitor management server 16. Through this notification, the visitor management server 16 is able to keep updated presence information indicating entry or exit of each visitor. The notification indicating entry, and the notification indicating exit, may be the same in content, as long as it has an identifier for identifying the visitor. For example, when the visitor management server 16, which has presence information indicating no presence for the visitor, receives a notification from the visitor, the visitor management server 16 determines that the visitor enters. When the visitor management server 16, which has presence information indicating presence for the visitor, receives a notification from the visitor, the visitor management server 16 determines that the visitor exits. Each visitor may be identified, for example, with an email address that may be input by the visitor when the visitor terminal 14 accesses the URL of the visitor management server 16.

The visitor management server 16 may be a system provided by the third party vendor. Alternatively, the visitor management server 16 may be a part of the presentation management server 11.

Further, the visitor terminal 14 may not transmit a notification indicating entry when the visitor enters, as the visitor management server 16 is able to know that the visitor is present through a vote from the visitor. In such case, the visitor terminal 14 only sends a notification when the visitor exits.

The presentation management server 11 may be implemented by an information processing apparatus such as a PC. The presentation management server 11 is a system that manages a presentation schedule and recommends the exhibitor to additionally have a presentation on a specific exhibit based on votes from the visitors. In alternative to adding a new presentation, the presentation management server 11 may modify the presentation schedule of the already-scheduled presentation, based on votes from the visitors. The presentation management server 11 receives votes from the visitors for one or more exhibits, analyzes the votes, and determines an exhibit to be recommended for presentation based on analysis of votes and information indicating availability of such as exhibit booths or any other place at the exhibition. The presentation management server 11 then sends a notification to the exhibitor terminal 13 of the exhibitor in charge of that recommended exhibit, to recommend to have a presentation on the recommended exhibit (or to recommend to change a presentation schedule for the recommended exhibit). When the presentation management server 11 receives acceptance to the recommendation from the exhibitor terminal 13, the presentation management server 11 schedules a presentation on that exhibit (or changes the presentation schedule), and sends a notification about the presentation to the visitor terminals 14 of the visitors who has voted that recommended exhibit and the exhibition guidance terminal 15.

The exhibitor terminal 13 is implemented by a PC, a mobile phone, or a smart device, which is operated by the exhibitor who presents the exhibit. The exhibitor terminal 13 receives recommendation to have a presentation on a specific exhibit from the presentation management server 11, and sends a response indicating whether to accept that recommendation to the presentation management server 11. In this embodiment, the exhibit registration terminal 12 and the exhibitor terminal 13 are different terminals, however, the exhibitor terminal 12 and the exhibitor terminal 13 may be incorporated into one terminal.

The exhibition guidance terminal 15 is implemented by a PC, which connects to a display or a projector at the exhibition, to display guidance to the visitors at the exhibition. When presentation schedule information is received from the presentation management server 11, the exhibition guidance terminal 15 controls the display or projector to display information about the presentations that are scheduled for the visitors. The exhibition guidance terminal 15 may further send information about the presentations to a terminal operated by an exhibition staff who is in charge of announcement. In such case, the exhibition staff announces the presentation schedule based on the notification.

Figure 2:
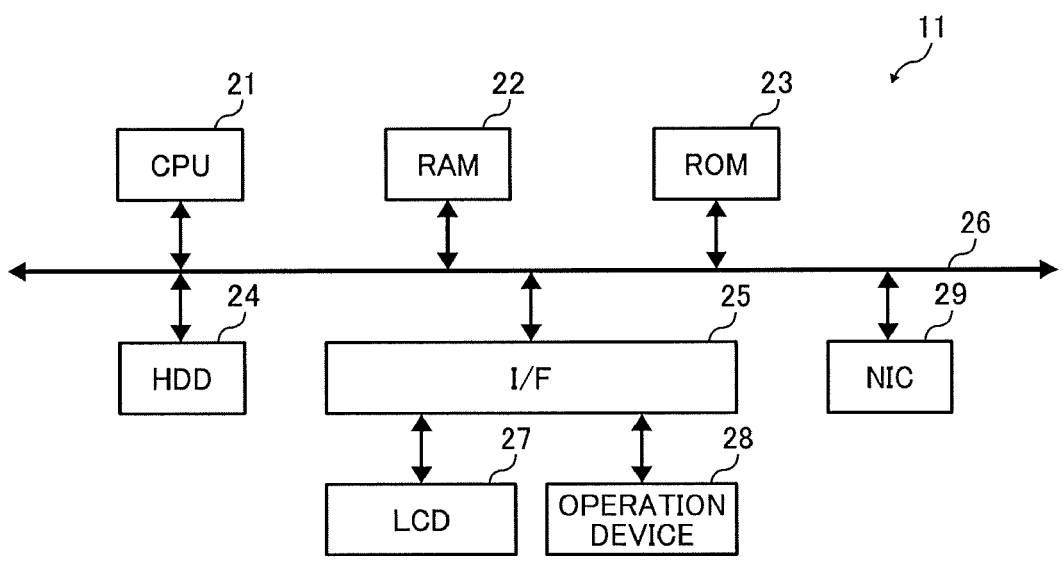
FIG. 2 is a schematic block diagram illustrating a hardware configuration of the presentation management server of FIG. 1, according to an embodiment of the present invention.

FIG. 2 illustrates a hardware configuration of the presentation management server 11, according to an embodiment of the present invention. The presentation management server 11 is implemented by an information processing apparatus such as a general-purpose computer. As illustrated in FIG. 2, the presentation management server 11 includes a central processing unit (CPU) 21, a random access memory (RAM) 22, a read only memory (ROM) 23, a hard disk drive (HDD) 24, an interface (I/F) 25, and a network interface circuit (NIC) 29, which are connected through a bus 26.

The I/F 25 is further connected to a liquid crystal display (LCD) 27 and an operation device 28. The CPU 21 is a processor that controls entire operation of the presentation management server 11. The RAM 22 is a volatile memory capable of reading or writing data at high speeds, and functions as a work area for the CPU 21 in processing. The ROM 23 is a non-volatile read only memory, which stores program such as firmware. The HDD 24 is a non-volatile readable or writable memory, and stores the operating system (OS), various control programs, and application programs. The I/F 25 connects various hardware through the bus 26 or to the network N, to control the hardware. The LCD 27 is a visual user interface, which allows the user to check status of the PC (presentation management server 11).

The operation device 28 is a user interface that allows the user to input various information to the PC (presentation management server 11), such as a keyboard and a mouse. The NIC 29 is a network interface controller, which may be implemented by an adaptor that connects the presentation management server 11 to the network N.

In operation, the CPU 21 loads control program from the ROM 23 or the HDD 24 to perform various operations for managing a presentation schedule as described below.

Figure 3:
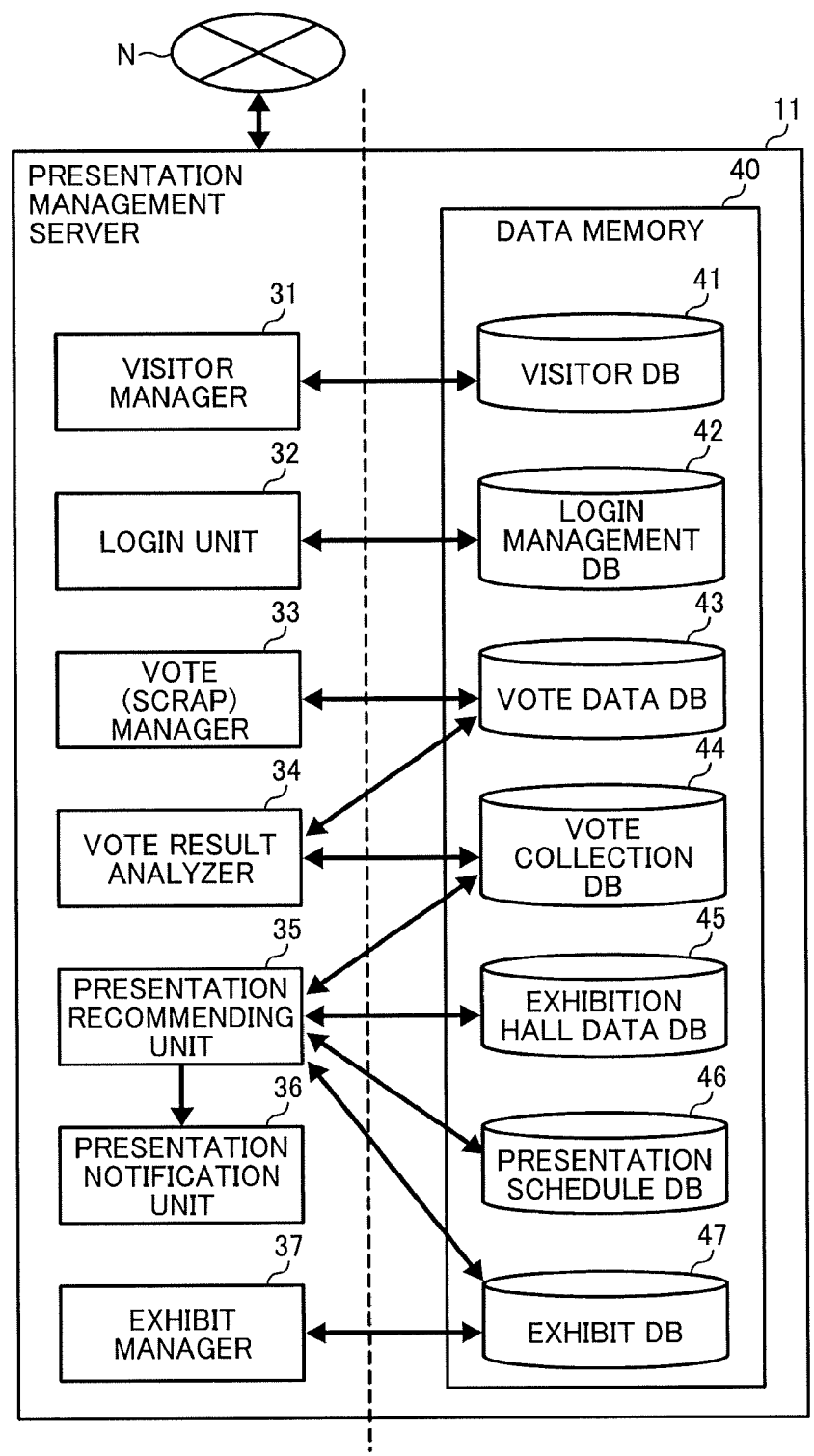
FIG. 3 is a schematic block diagram illustrating a functional configuration of the presentation management server of FIG. 1, according to an embodiment of the present invention.

Next, a functional configuration of the presentation management server 11 is described referring to FIG. 3.

The presentation management server 11 includes a visitor manager 31, a login unit 32, a vote manager 33, a vote result analyzer 34, a presentation recommending unit 35, a presentation notification unit 36, and an exhibit manager 37, each of which is implemented by instructions of the CPU 21 according to the control program. The presentation management server 11 further includes a data memory 40 that stores various data, which may be implemented by any desired memory such as the RAM 22. In this embodiment, the data memory 40 stores therein a visitor DB 41, a login management DB 42, a vote data DB 43, a vote collection DB 44, an exhibition hall data DB 45, a presentation schedule DB 46, and an exhibit DB 47.

The visitor manager 31 receives a notification indicating entry or exit of each visitor from the visitor management server 16, and stores, for each visitor, an identifier of the visitor and presence information indicating presence of the visitor in association in the visitor DB 41. The visitor DB 41 is a database on the data memory 40 of the presentation management server 11, which stores information indicating whether the visitor is at the exhibition. For example, as illustrated in FIG. 5, the visitor DB 41 stores, for each visitor, a visitor ID for identifying the visitor and information indicating whether the visitor is present at the exhibition. In this embodiment, an email address input by the visitor ("visitor email address") is used as the visitor ID.

The exhibit manager 37 receives a request for registering the exhibit (registration request) from the exhibit registration terminal 12, and stores information regarding the registered exhibit in the exhibit DB 47. The exhibit DB 47 is a database on the data memory of the presentation management server 11, which stores information regarding the registered exhibit. For example, as illustrated in FIG. 6, the exhibit DB 47 stores, for each registered exhibit, an exhibit ID for identifying the exhibit, an email address of the exhibitor in charge of the exhibit, an exhibit item such as a name of the exhibitor, a URL to be accessed by the visitor terminal 14 when voting for the exhibit, and a place to present the exhibit in association with one another.

The vote (scrap) manager 33 receives a vote for the exhibit from the visitor terminal 14, and registers the result of vote in the vote data DB 43 to keep updated information regarding votes to each exhibit. The vote data DB 43 is a database on the data memory 40 of the presentation management server 11, which stores information indicating votes to each exhibit that are made through the visitor terminals 14. For example, as illustrated in FIG. 8, the vote data DB 43 stores, for each vote, the visitor ID for identifying the visitor who votes, an exhibit ID for identifying the exhibit that is voted, and a vote date/time at which the visitor voted for the exhibit in association.

The login unit 32 processes login to authenticate the visitor terminal 14, before accepting the vote to the exhibit from the visitor terminal 14. The login management DB 42 is a database on the data memory 40 of the presentation management server 11, which stores information to be used for the login process. For example, as illustrated in FIG. 9, the login management DB 42 stores an email address of the visitor terminal 14 that requests for login as a visitor ID, a login confirmation URL to be used for login, a date/time at which the login confirmation URL is expired, and a date/time when the login confirmation URL is last accessed.

The vote result analyzer 34 analyzes the result of votes based on vote information stored in the vote data DB 43, and registers the analysis result in the vote collection DB 44. The vote collection DB 44 is a database on the data memory 40 of the presentation management server 11, which stores an analysis result of votes from the visitors at the exhibition. For example, as illustrated in FIG. 13, the vote collection DB 43 stores, for each exhibit at the exhibition, an exhibit ID for identifying the exhibit, and various information obtained based on the votes for the exhibit.

The total number of votes ("total votes") is a number of votes that have been collected for the exhibit until a current update time. The current update time is a time at which the vote result analyzer 34 refers to the vote data DB 43 to collect information regarding votes, analyze the collected information, and stores the analysis result to the vote collection DB 44. The rank in total number of votes ("total votes rank") for each exhibit is assigned based on the total number of votes. The higher total number of votes is assigned with a higher rank with a lower number.

The "last update" field indicates a last update time when the votes for the exhibit were collected for analysis. The "last votes" field indicates a number of votes that have been collected for the exhibit until the last (previous) update time. For example, for the exhibit with the exhibit ID P1, the last update time is 11:00, and the number of votes collected until the last update time (11:00) is 48. The "last rank" field indicates a rank on the total number of votes at the last update time. The higher total number of votes is assigned with a higher rank with a lower number.

The "difference in vote" field indicates a difference in total number of votes between the last update time and the current update time, that is, a number of votes that have been collected after the last update time. For example, for the exhibit P1, the number of votes collected until the last update time is 48, and the number of votes collected until the current update time is 50, such that their difference is 2. Assuming that the votes are collected every one hour, the "difference in vote" indicates that two votes have been received in one hour between the last update time of 11:00 and the current update time of 12:00.

The "difference rank" field indicates a rank on the difference in vote between the last update time and the current update time. More specifically, the exhibit with a higher number of difference in vote from the last update time is assigned with a higher rank.

The "votes of visitor present" field indicates a total number of votes that have been received from the visitors who are present at the current update time. For example, for the exhibit P1, out of the total number of votes collected up to the current update time (50 votes), only 5 votes are received from the visitors who are currently present at the exhibition. That is, 45 visitors out of 50 visitors who got interested in the exhibit P1 have already left the exhibition. The rank in total number of votes from the present visitors ("rank (visitor present)") for each exhibit is assigned based on the total number of votes from the present visitors.

The "difference in vote (visitor present)" field indicates, out of the number of votes that have been collected after the last update time, a number of votes that have been received from the visitors who are currently present at the exhibition. For example, for the exhibit P1, out of the total number of votes collected between the last update time and the current update time (2 votes), only one vote is received from the visitor currently at the exhibition.

The "difference rank (visitor present)" indicates a rank on the difference in vote between the last update time and the current update time, for the votes that are received from the visitors currently at the exhibition.

Alternatively, the vote result analyzer 34 may analyze a number of votes for each exhibit every predetermined time, and generates a time-based vote collection table as illustrated in FIG. 23 on the vote collection DB 44.

Referring back to FIG. 3, the presentation recommending unit 35 refers to the vote collection DB 44 storing the analysis result of the vote result analyzer 34, the exhibition hall data DB 45, and the presentation schedule DB 46, to determine an exhibit to be recommended for presentation, and a recommended presentation time, for notification to the exhibitor terminal 13.

The exhibition hall DB 45 is a database on the data memory 40 of the presentation management server 11, which stores information regarding the exhibition halls at the exhibition. For example, as illustrated in FIG. 15, the exhibition hall DB 45 includes, for each exhibition hall at the exhibition, an exhibition hall name, a number of seats available at the exhibition hall ("seating capacity"), and a place of the exhibition hall. The place indicates whether the exhibition hall is in public place at the exhibition that can be shared by all exhibitors ("public"), or in a specific exhibition booth that can be only used by the exhibitor at that exhibition booth. In case of exhibition booth, identification information for identifying the specific exhibition booth is stored in the "place" field.

The presentation schedule DB 46 is a database on the data memory 40 of the presentation management server 11, which stores information regarding a presentation schedule for each exhibition hall. For example, as illustrated in FIG. 16, the presentation schedule DB 46 includes, for each exhibition hall at the exhibition, a name of the exhibition hall, the presentation starting time, the presentation end time, and the presentation topic indicating an exhibit to be presented.

In response to receiving a notification indicating addition of a new presentation from the presentation recommending unit 35, the presentation notification unit 36 transmits an email notifying the newly scheduled presentation to the visitor terminals 14, and/or transmits a notification about the newly scheduled presentation to the exhibition guidance terminal 15, through the NIC 29. In case the visitor terminal 14 is installed with the dedicated application, the presentation recommending unit 35 may use a push notification function of the dedicated application to notify the visitor terminal 14 of the newly scheduled presentation, instead of transmitting the email. Further, the notification about the newly scheduled presentation may be transmitted to the visitor terminals 14 of all visitors who have voted for the exhibit and currently at the exhibition, or to the visitor terminals 14 of the visitors who have voted for the exhibit during a certain time period.

Figure 4:
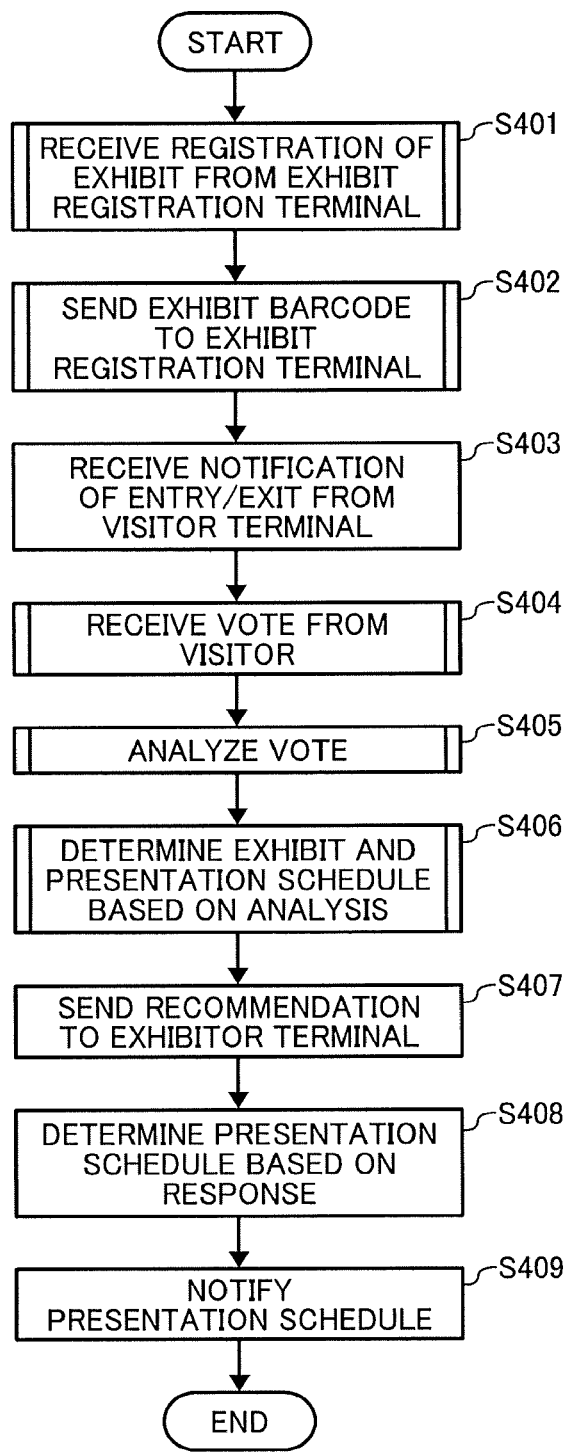
FIG. 4 is a flowchart illustrating operation of managing a presentation schedule, performed by the presentation management server of FIG. 3, according to an embodiment of the present invention.

Now, referring to FIG. 4, example operation of managing a presentation schedule, performed by the presentation management server 11, is described.

At S401, the exhibit manager 37 receives a request for registering an exhibit from the exhibit registration terminal 12 through the network N. At S402, the exhibit manager 37 sends, to the exhibit registration terminal 12 that sends the request for registration, data of a barcode or a NFC tag to be attached to the exhibit to be registered. Based on the received data of barcode or NFC tag, the exhibit registration terminal 12 may cause a printer to print the barcode or NFC tag, to be attached to the registered exhibit. The output barcode or NFC tag is attached to the registered exhibit, for example, by staff at the exhibition. S401 and S402 are performed in response to a request for registration, such that the time when S401 and S402 are performed may not be the same as the other steps of FIG. 4.

At S403, the visitor manager 31 receives a notification indicating entry or exit of a visitor, from the visitor management server 16 that keeps a record of entry or exit of the visitor as each visitor enters or exits the exhibition. S403 is periodically or constantly performed such that information regarding presence of the visitor is kept updated. Accordingly, S403 may not be performed at the same time as the other steps of FIG. 4.

At S404, the vote manager 33 receives information indicating selection of a specific exhibit from the visitor terminal 14, as the visitor terminal 14 selects (votes) that specific exhibit using information read from the barcode or NFC tag attached to that specific exhibit. The vote manager 33 keeps updated information regarding the received votes in the vote data DB 43. Since S404 is performed in response to the vote from the visitor, S404 may not be performed at the same time as the other steps of FIG. 4.

At S405, the vote result analyzer 34 analyzes the votes for one or more exhibits that area managed by the vote manager 33 using the vote data DB 43, and the visitor presence information managed by the visitor manager 31 using the visitor DB 41, at any desired time such as every predetermined time period.

At S406, the presentation recommending unit 35 determines an exhibit to be recommended for presentation ("recommended exhibit"), and recommended presentation schedule for that recommended exhibit, based on analysis of S405.

At S407, the presentation recommending unit 35 sends a notification, which recommends to give a presentation on the recommended exhibit with the recommended presentation schedule, to the exhibit registration terminal 12 of the exhibitor in charge of the recommended exhibit. For example, the presentation recommending unit 35 may send the notification to the exhibitor email address that has been registered by the exhibitor at S401. In this manner, the exhibitor is able to receive such notification through any terminal other than the exhibit registration terminal 12.

At S408, the presentation recommending unit 35 determines the presentation schedule of the recommended exhibit, based on a response from the exhibit registration terminal 12. In one example, the presentation recommending unit 35 may modify the presentation schedule, which is stored in the presentation schedule DB 46 (FIG. 16), based on a response from the exhibit registration terminal 12.

At S409, the presentation notification unit 36 causes, for example, an exhibitor staff to announce the presentation schedule regarding the recommended exhibit, which is determined at S408, and the operation ends.

Figure 7:
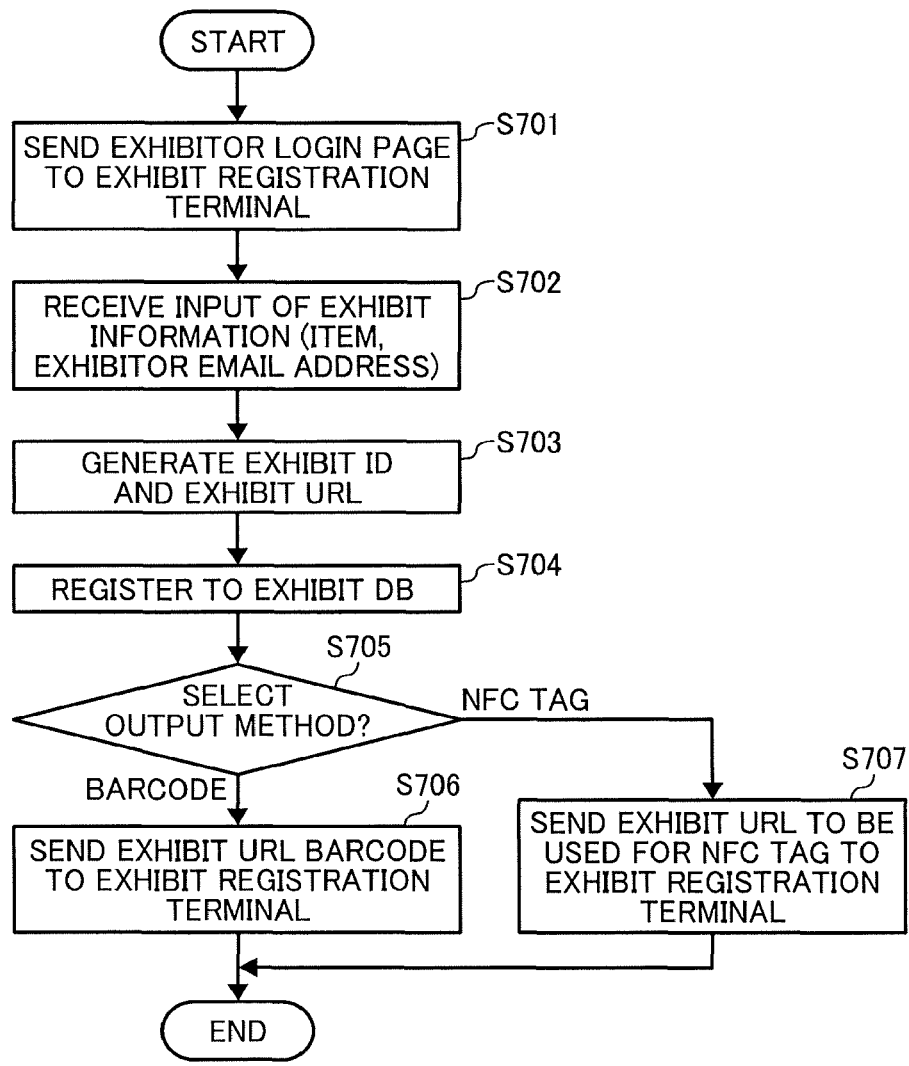
FIG. 7 is a flowchart illustrating operation of registering an exhibit to the exhibit database, performed by the presentation management server of FIG. 3, according to an embodiment of the present invention.

Referring to FIG. 7, operation of registering an exhibit, performed by the exhibit manager 37 of the presentation management server 11 at S401 and S402 of FIG. 4, is explained according to an embodiment of the present invention. FIG. 7 is a flowchart illustrating operation of registering an exhibit in the exhibit DB 47, performed by the exhibit manager 37, according to the embodiment.

In this embodiment, the exhibit manager 37 of the presentation management server 11 transmits or receives information to or from the exhibit registration terminal 12 of FIG. 1 through the network N. In response to a request for registering an exhibit from the exhibit registration terminal 12, at S701, the exhibit manager 37 sends an exhibitor login screen to the exhibit registration terminal 12 for display through a web browser on the exhibit registration terminal 12. The exhibit registration terminal 12 receives a user input of an exhibitor ID and a password, through the displayed exhibitor login screen. Based on the exhibitor ID and the password transmitted from the exhibit registration terminal 12, the exhibit manager 37 authenticates the exhibitor and logs in the exhibitor when authenticated.

At S702, the exhibit manager 37 transmits, to the exhibit registration terminal 12, an exhibit information input screen that requests the exhibitor to input various exhibit information such as an exhibit item indicating an item to be registered, an exhibitor email address indicating an email address of the exhibitor, an exhibit place indicating a place where the exhibit will be located, etc. The exhibit manager 37 receives, from the exhibit registration terminal 12, the input information such as the exhibit item, the exhibitor email address, and the exhibit place. In this example, the exhibit place, such as a specific booth at the exhibition, has been previously determined when the exhibitor registers to be an exhibitor at the exhibition. Alternatively, the exhibit place may be automatically assigned at the time the exhibit is registered. In such case, the exhibit manager 37 may not request the exhibitor to input such information regarding the exhibit place.

As the exhibit manager 37 receives the input information of the exhibit item, the exhibit email address, and the exhibit place, at S703, the exhibit manager 37 generates an exhibit ID for identifying the exhibit to be registered, and an exhibit URL for the exhibit to be registered. The exhibit URL is a URL of a webpage that accepts a vote to that exhibit from a visitor who gets interest in that exhibit. The exhibit URL is generated for each exhibit to be registered.

At S704, the exhibit manager 37 stores, in the exhibit DB 47 (FIG. 6), the exhibit ID, the exhibitor email address, the exhibit item, the exhibit URL, and the exhibit place, in association with one another.

At S705, the exhibit manager 37 sends, to the exhibit registration terminal 12, a selection screen that requests the exhibitor to select whether to use a barcode or a NFC tag, to identify the exhibit. The exhibit manager 27 receives, from the exhibit registration terminal 12, a response indicating whether the barcode is selected or the NFC tag is selected.

When the barcode is selected at S705 ("barcode"), at S706, the exhibit manager 37 generates a barcode encoded with the exhibit URL, and sends the barcode to the exhibit registration terminal 12. When the NFC tag is selected at S705 ("NFC tag"), at S707, the exhibit manager 37 sends the exhibit URL to be used for generating the NFC tag, to the exhibit registration terminal 12. The exhibit registration terminal 12 encodes the received exhibit URL to a NFC tag. The exhibitor attaches the barcode 51 or the NFC tag, which is encoded with the exhibit URL, to an information sheet 50 explaining the exhibit (may be referred to as the "exhibit 50" for simplicity) as illustrated in FIG. 11.

In this embodiment, in case the barcode is selected, the exhibit manager 37 of the presentation management server 11 generates the barcode for transmission to the exhibit registration terminal 12. Alternatively, in a substantially similar manner as the NFC tag is generated, the exhibit manager 37 may send the exhibit URL to cause the exhibit registration terminal 12 to generate the barcode based on the received exhibit URL. The exhibit registration terminal 12 may be installed with the dedicated application, which provides such function of converting the exhibit URL, or the exhibit ID, to the barcode or NFC tag.

Further, one exhibitor may be assigned to each exhibit. Alternatively, one exhibitor may be assigned with more than one exhibit. That is, the exhibitor email address to be registered in the exhibit DB 47 may be different for each exhibit, or may be the same among different exhibits. Alternatively, more than one exhibit email addresses may be registered for one exhibit.

Further, even when the request for registration is received, if the exhibitor has already logged in or has previously registered the exhibit, some information such as the exhibit place and the exhibitor email address do not have to be input, as such information can be automatically read from the exhibit DB 47 as long as the presentation management server 11 can identify the exhibitor who is currently logs in.

Figure 10:
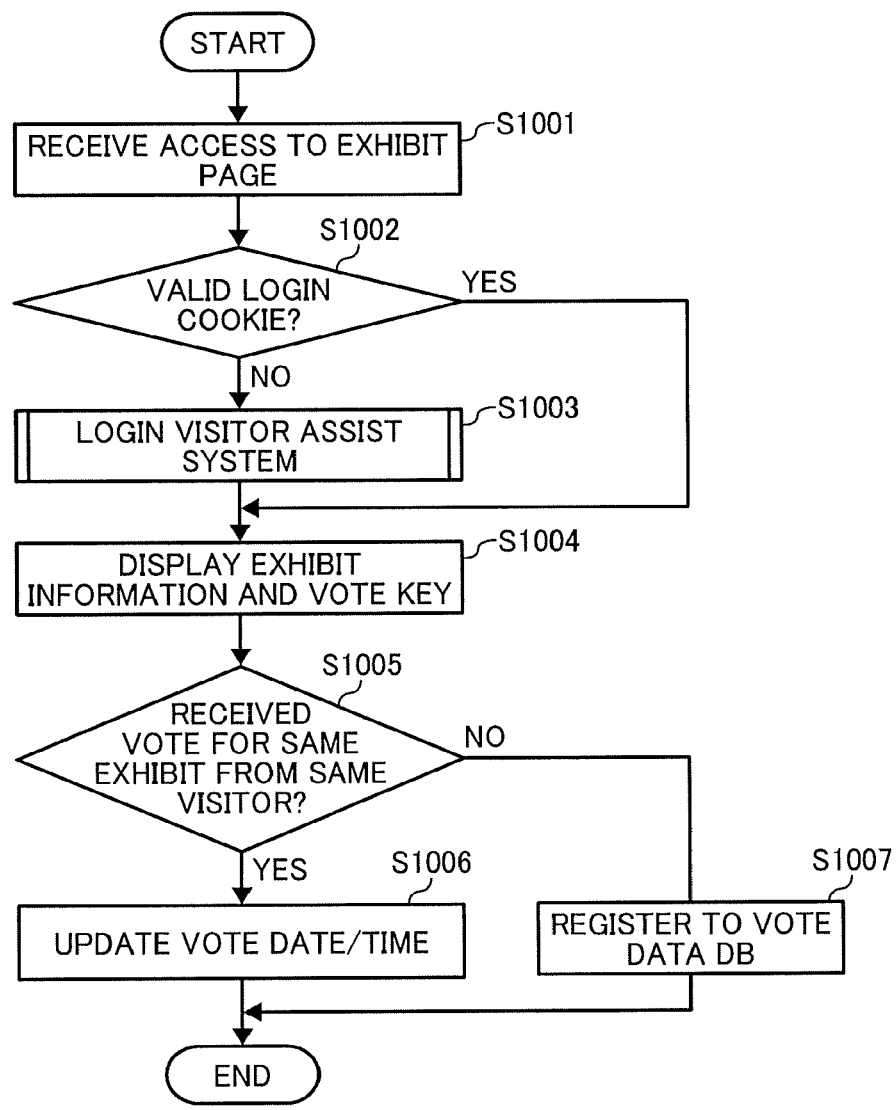
FIG. 10 is a flowchart illustrating operation of processing a vote for the exhibit, performed by the presentation management server of FIG. 3, according to an embodiment of the present invention.

Referring now to FIG. 10, operation of processing a vote for the exhibit, which is received from the visitor terminal 14, performed at S404 of FIG. 4, is explained according to an embodiment of the present invention.

When the visitor gets interested in any specific exhibit, the user captures (or touches) the barcode (or the NFC tag), attached to that exhibit of interest, with the visitor terminal 14. In the example case of barcode, as illustrated in FIG. 11, the visitor captures the image of the barcode 51 with a camera of the visitor terminal 14. The visitor terminal 14 then analyzes the captured barcode to obtain an exhibit URL of the exhibit of interest, and displays the exhibit URL on a display of the visitor terminal 14. If the visitor terminal 14 is installed with dedicated application, the visitor terminal 14 may analyze the barcode using dedicated application.

At S1001, the presentation management server 11 detects an access to the exhibit URL of a specific exhibit from the visitor terminal 14.

The vote manager 33 of the presentation management server 11 determines whether the visitor has already logged into a visitor assist system, such as by determining whether a cookie indicating the previous login has been received. When the vote manager 33 determines that such cookie is not received, the vote manager 33 determines that the visitor terminal 14 accesses the visitor assist system for the first time, and the operation proceeds to S1003. When the vote manager 33 determines that the visitor terminal 14 has previously accessed the visitor assist system, the operation proceeds to S1004.

At S1003, the vote manager 33 processes login of the visitor terminal 14 to the visitor assist system, for example, as described below referring to FIG. 12.

At S1004, the vote manager 33 causes the visitor terminal 14 to display various information regarding the selected exhibit, with a key allowing the visitor to vote the selected exhibit.

In response to pressing of the vote key at the visitor terminal 14, at S1005, the vote manager 33 refers to the vote data DB 43 (FIG. 8) to determine whether the vote has been received from the same visitor for the same exhibit. When it is determined that the vote has been previously received from the same visitor for the same exhibit ("YES" at S1005), the operation proceeds to S1006. At S1006, the vote manager 33 updates the vote date/time in the vote data DB 43 to the current date/time that the vote is received.

When it is determined that the vote has not been received from the same visitor for the same exhibit ("NO" at S1005), the operation proceeds to S1007. At S1007, the vote manager 33 newly registers, in the vote data DB 43, the visitor ID for identifying the visitor terminal (or the visitor) that sends the vote to the selected exhibit, the exhibit ID for identifying the selected exhibit, and the current date/time that the vote is received.

Figure 12:
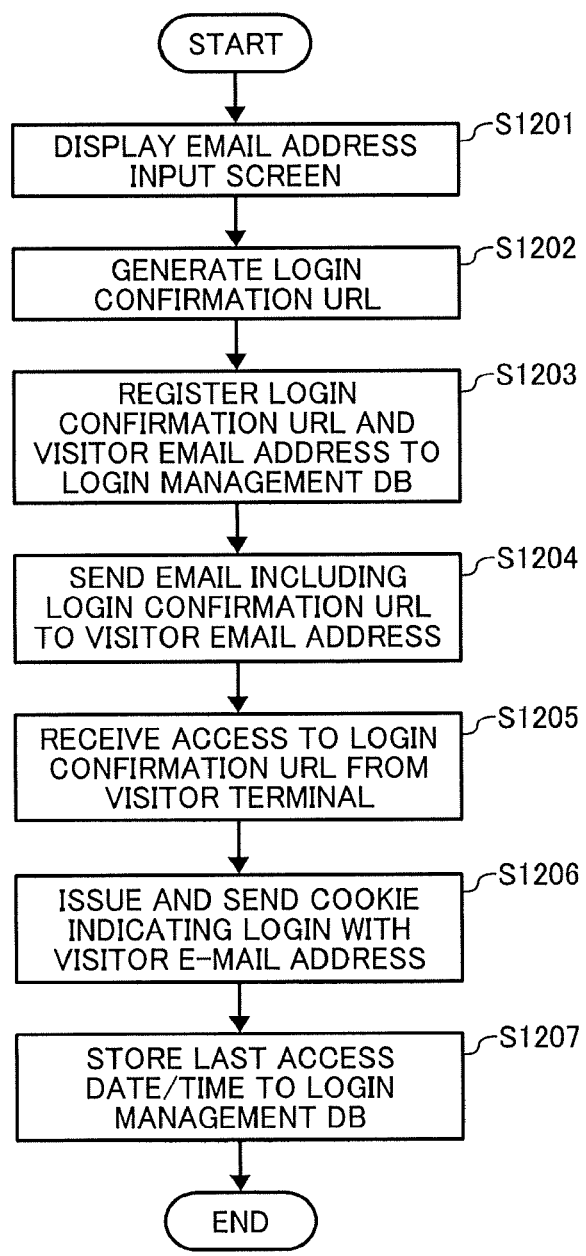
FIG. 12 is a flowchart illustrating operation of processing login, performed by the presentation management server of FIG. 3, according to an embodiment of the present invention.

Referring to FIG. 12, operation of processing login, performed at S1003 of FIG. 10, is explained according to the embodiment.

At S1201, the login unit 32 controls the visitor terminal 14 to display, through the web browser installed on the visitor terminal 14, an input screen that requests the visitor to input an email address of the visitor operating the visitor terminal 14.

In response to receiving the input email address from the visitor terminal 14, at S1202, the login unit 32 generates a login confirmation URL to be used for checking whether the input email address is a valid email address.

At S1203, the login unit 32 stores, in the login management DB 42 (FIG. 9), the input visitor email address, the generated login confirmation URL, and the valid expiration date/time indicating the date/time when the login confirmation URL becomes invalid. In this embodiment, the visitor email address is used as an identifier for the visitor.

At S1204, the login unit 32 sends an email including the login confirmation URL, to the visitor email address. The visitor terminal 14, which receives the email including the login confirmation URL, causes a display to display content of the email.

Assuming that the visitor at the visitor terminal 14 selects the login confirmation URL, at S1205, the login unit 32 receives an access to the login confirmation URL from the visitor terminal 14.

At S1206, the login unit 32 sends, to the visitor terminal 14 that accesses, a cookie indicating that the login is accepted with the visitor email address input at S1201. The visitor terminal 14 stores the received cookie in its local memory.

At S1207, the login unit 32 stores the current date/time that the access from the visitor terminal 14 is received, as the last access date/time, in the login management DB 42 (FIG. 9).

In the above-described embodiment referring to FIG. 10, when the cookie indicating the log in to the visitor assist system, is not received at S1002, the visitor email address is newly registered to the login management DB 42 as described referring to FIG. 12. Alternatively, when requesting for input of the email address from the visitor terminal 14 at S1201, the login unit 32 may request for input of a password. The login unit 32 then stores, in the login management DB 42, the input visitor email address and the input password in association with each other. Once the visitor email address as the visitor ID, and the password are stored, the login unit 32 is able to check authentication of the login user based on a match between the visitor ID and the password that are input by the user, and the visitor ID and the password that are stored in the login management DB 42. Based on authentication, the login unit 32 may generate a cookie indicating that the user has logged in.

Figure 14:
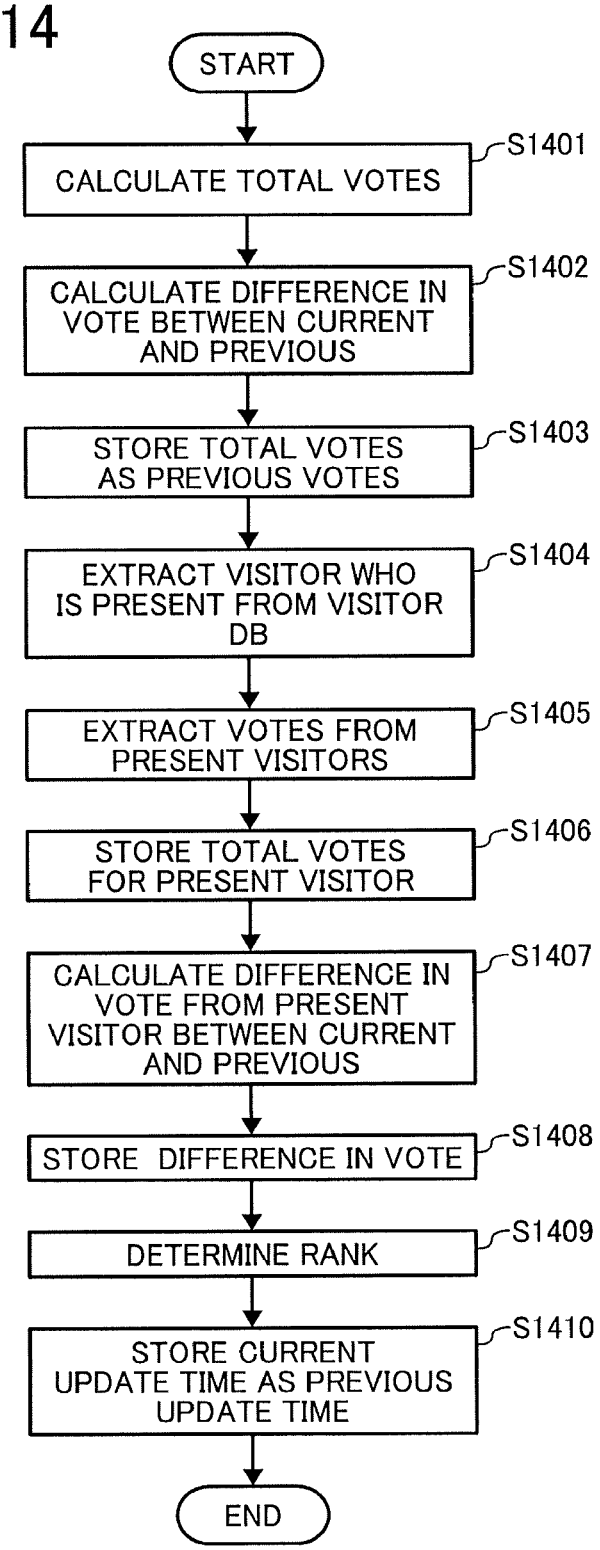
FIG. 14 is a flowchart illustrating operation of analyzing the collected votes, performed by the presentation management server of FIG. 3, according to an embodiment of the present invention.

Referring to FIG. 14, operation of analyzing the result of votes that can be collected from the vote data DB 43, performed by the vote result analyzer 34 at S405 of FIG. 4, is described according to the embodiment. The operation of FIG. 14 may be performed at any desired time, for example, at every predetermined time or in response to an instruction for analyzing the result of votes from a person in charge of the exhibition. In the following, it is assumed that the vote result analyzer 34 analyzes the votes every one hour to update the vote collection DB 44.

At S1401, the vote result analyzer 34 refers to the vote data DB 43 (FIG. 8), to count a total number of votes for each exhibit ID, and stores the counted number in the vote collection DB 44 (FIG. 13) as the total number of votes ("total votes").

At S1402, the vote result analyzer 34 calculates, for each exhibit ID, a difference between the counted total number of votes and the previous total number of votes that has been previously obtained at the last update time, and stores the calculated difference in the vote collection DB 44 as the difference in vote ("difference in vote"). In case of analyzing the votes for the first time, the total number of votes that is currently obtained is stored in the vote collection DB 44, as the number of votes obtained for the last update time. In such case, the difference in vote will be "0".

Through calculating the difference in vote between the current update time and the previous update time, the change in number of votes from the previous update time can be checked, as described above referring to FIG. 13.

At S1403, the vote result analyzer 34 stores the total number of votes, which is obtained at S1401, as the previous number of votes for a new record to be ready for the next update time.

At S1404, the vote result analyzer 34 refers to the visitor DB 41 (FIG. 5) to extract the visitor ID for identifying the visitor that is currently visiting the exhibition (the visitor who is present).

At S1405, the vote result analyzer 34 extracts the votes collected from the visitors who are present, from the votes stored in the vote data DB 43, by only extracting the votes that are stored in association with the extracted visitor IDs.

At S1406, the vote result analyzer 34 counts, for each exhibit ID, the total number of votes that are extracted at S1405, and stores the counted number of votes as a total number of votes for the present visitors. In this way, the votes from the visitors who have already left the exhibition will be excluded, resulting in the total number of votes from the visitors who are currently at the exhibition.

At S1407, the vote result analyzer 34 extracts, out of the votes associated with the visitor IDs each identifying the visitor who is currently at the exhibition that are obtained at S1405 the votes having the vote date/time that is after the previous update time.

Based on the votes extracted at S1407, at S1408, the vote result analyzer 34 counts a number of votes for each exhibit ID, and stores as the difference in number of votes for the visitors currently at the exhibition. Through calculating the difference in vote between the current update time and the previous update time only for the visitors who are currently present, the change in number of votes from the present visitors from the previous update time can be checked, as described above referring to FIG. 13.

At S1409, the vote result analyzer 34 determines, for each exhibit, ranks on the total number of votes, the difference in vote, the total number of votes for the visitors currently present, and the difference in vote for the visitors currently present, such that the higher rank is assigned to the higher number of votes, and stores the determined ranks in the vote collection DB 44.

At S1410, the vote result analyzer 34 stores the current update time in the vote collection DB 44, as the previous (last) update time for the next record.

In the above-described embodiment, the total number of votes are counted for each exhibit when collecting information regarding votes. Alternatively, the vote result analyzer 34 may add a vote that is received from the visitor terminal 14, to the total number of votes stored in the vote collection DB 44, every time such vote is received from the visitor terminal 14.

With the analysis result stored in the vote collection DB 44, the presentation management server 11 is able to determine an exhibit that all of the visitors who have visited have interests, an exhibit that visitors who are currently visiting have interests, or an exhibit that visitors who recently votes have interests, etc.

Figure 17:
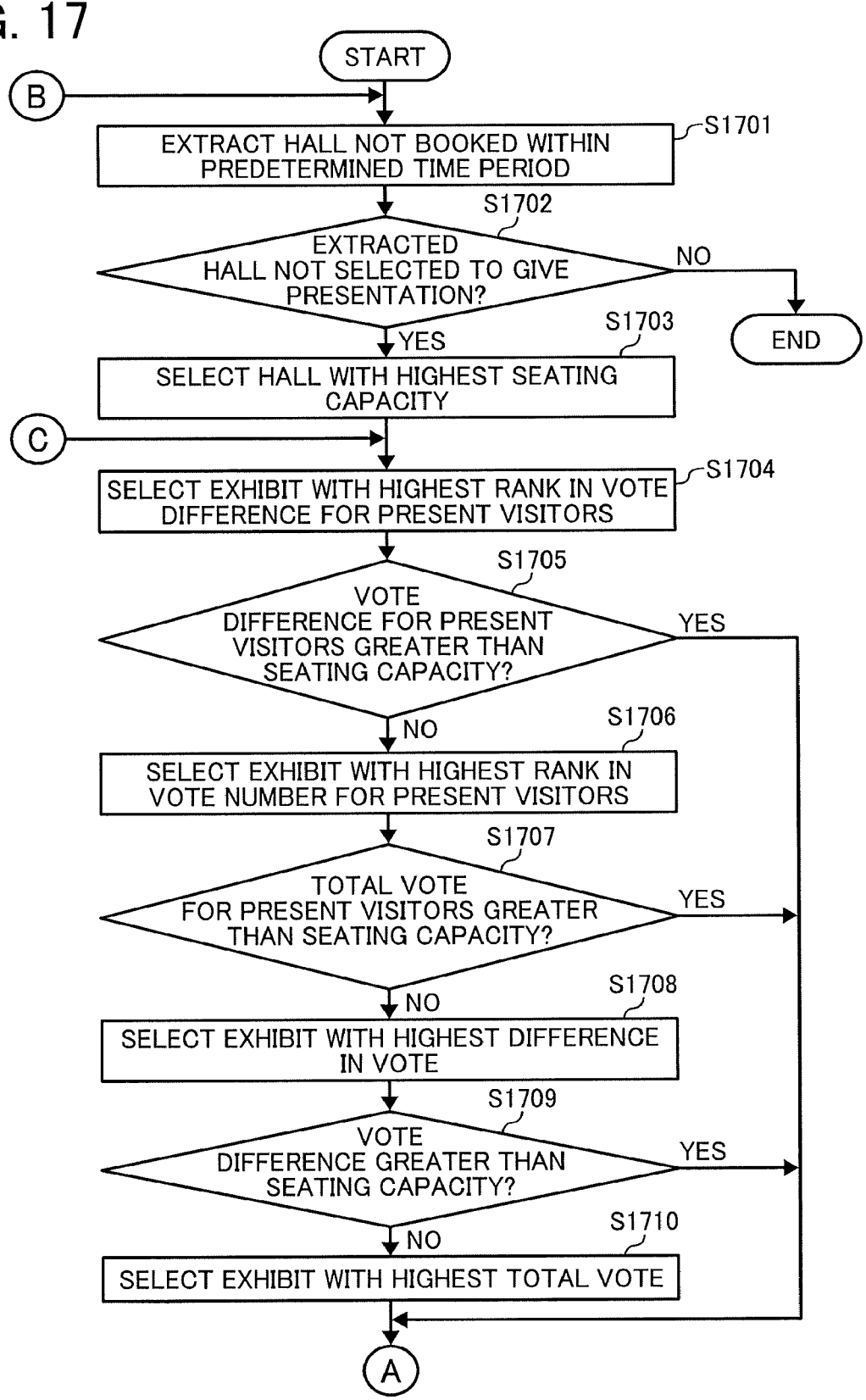
FIGS. 17 and 18 are a flowchart illustrating operation of selecting an exhibit to be recommended for presentation, performed by the presentation management server of FIG. 3, according to an embodiment of the present invention.
Figure 18:
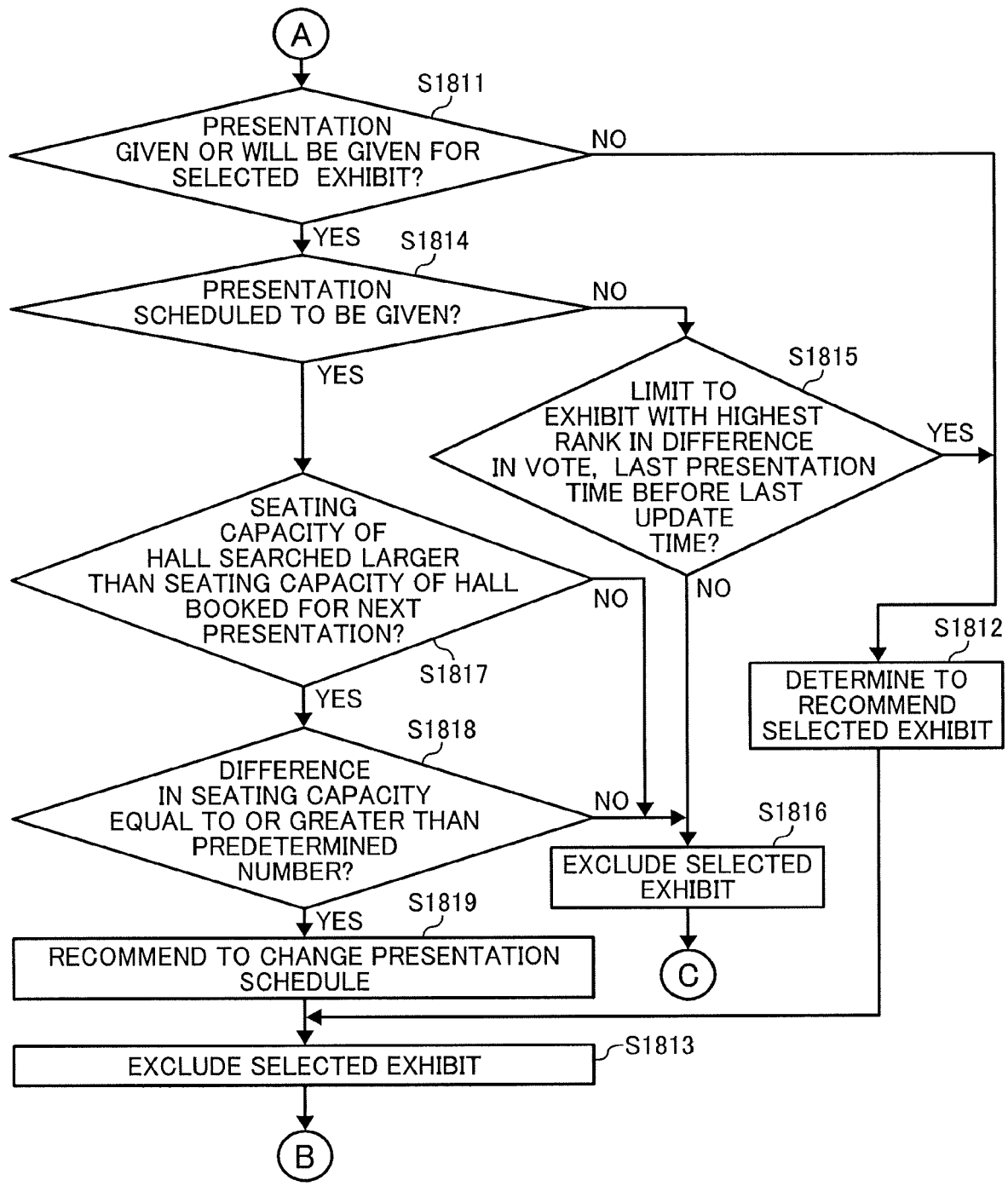

Referring to FIGS. 17 and 18, operation of determining an exhibit to be recommended for presentation, performed by the presentation recommending unit 35, is described according to an embodiment. FIGS. 17 and 18 are a flowchart illustrating operation of determining an exhibit to be recommended for presentation, according to the ranks obtained from the vote collection DB 44. The operation of FIGS. 17 and 18 may be performed at S406 of FIG. 4.

At S1701, the presentation recommending unit 35 refers to the presentation schedule DB 46 (FIG. 16) to extract an exhibition hall, which is not booked for at least a predetermined presentation time period when counted from a recommended presentation start time. In this example, the recommended presentation start time is set within a time period of one hour to two hours from the current update time. The predetermined presentation time period is set to, for example, 60 minutes or more. As a result, the presentation recommending unit 35 extracts one or more sets of exhibition hall and presentation schedule (that is, the recommended presentation start time, and the presentation time period) that are available. When there is at least one set of exhibition hall and presentation schedule that is available, the operation proceeds to S1702. Otherwise, the operation ends.

At S1702, the presentation recommending unit 35 further determines whether the extracted sets of exhibition hall and presentation schedule, have not been selected as a set of exhibition hall and presentation schedule for a presentation to be given based on recommendation. When there is at least one set of exhibition hall and presentation schedule, which has not been selected for a presentation to be given ("YES" at S1702), the operation proceeds to S1703. Otherwise, the operation ends.

At S1703, the presentation recommending unit 35 refers to the exhibition hall DB 45 (FIG. 15) to select the exhibition hall with highest seating capacity, out of the extracted exhibition halls obtained at S1702.

At S1704, the presentation recommending unit 35 refers to the vote collection DB 44 (FIG. 13) to select, out of the exhibits subject for selection, an exhibit having the highest rank in difference in vote for the visitors who are present. In this example, the exhibits subject for selection corresponds to one or more exhibits that can be presented at the exhibition hall that is selected at S1703. More specifically, if a specific exhibition booth is selected at S1703, one or more exhibits of the exhibitor who is assigned with that specific exhibition booth will be the exhibits subject for selection, except for those exhibits that will be presented based on recommendation. If an exhibit hall that is commonly used by all exhibitors is selected at S1703, all exhibits will be the exhibits subject for selection except for those exhibits that will be presented based on recommendation.

Further, in this embodiment, it is assumed that at least one exhibit that is recommended for presentation is obtained based on analysis of votes. However, if there is no exhibit that is recommended for presentation, the operation ends.

At S1705, the presentation recommending unit 35 determines whether a number of seats corresponding to the difference in vote for the visitors who are present, is greater than a number of seats that is indicated by the seating capacity of the exhibition hall extracted at S1703. In this example, the difference in vote for the visitors who are present could be used as an estimate number of visitors who will attend the presentation ("potential attendees"). When it is determined that the number of seats corresponding to the difference in vote is greater than the number of seats indicated by the seating capacity of the selected exhibition hall ("YES" at S1705), the operation proceeds to "A" of FIG. 17. More specifically, the presentation recommending unit 35 determines that, based on the total number of votes for a specific exhibit from the currently-visiting visitors that are collected between the previous update time and the current update time, there will be a sufficient number of potential attendees even if a presentation for that exhibit is newly scheduled.

After "A" of FIG. 17, the presentation recommending unit 35 refers to the presentation schedule of each exhibition hall, to determine whether to recommend the exhibitor to have a presentation about the recommended exhibit.

The presentation recommending unit 35 compares between the seating capacity of the selected exhibition hall and the number of potential attendees (for example, the difference in vote for the visitors currently at the exhibition), to make sure that there will be a sufficient number of potential attendees. For example, if the total number of votes collected from the visitors currently at the exhibition for all exhibits is about 20 votes, the exhibit having the highest rank in difference in vote may only have 5 votes. In such case, the exhibition hall with the seating capacity of 100 would not be appropriate to give a presentation about that exhibit. In such case, the presentation recommending unit 35 may use a different criterion for selecting the exhibit to be recommended for presentation, rather than searching for the exhibit having the highest rank in difference in vote for the visitors who are present. For this reason, in this example illustrated in FIG. 17, when the presentation recommending unit 35 determines that the seating capacity of the selected exhibition hall is equal to or greater than the estimated number of attendees at S1705, the operation proceeds to S1706 to try to select an exhibit using the different criterion.

Alternatively, the presentation recommending unit 35 may determine that there is a sufficient number of potential attendees, as long as the number of potential attendees that is estimated based on the analysis of votes is equal to or greater a predetermined number. This is because the visitors, who are currently at the exhibition and has voted during a time period between the last update time and the current update time, are most likely to attend the presentation, it would be more efficient to determine a presentation schedule based on the difference in vote for the visitors who are present.

Referring back to FIG. 17, when it is determined that the number of seats corresponding to the difference in vote is not greater than the number of seats indicated by the seating capacity of the selected exhibition hall ("NO" at S1705), at S1706, the presentation recommending unit 35 selects an exhibit having the highest rank in total number of votes from the present visitors. More specifically, since the number of potential attendees that is obtained based on the difference in vote for the present visitors is not sufficient, the presentation recommending unit 35 changes a criterion for selecting an exhibit to be recommended for presentation.

At S1707, the presentation recommending unit 35 determines whether a number of seats corresponding to the total number of votes for the visitors who are present, is greater than a number of seats that is indicated by the seating capacity of the selected exhibition hall extracted at S1703. When it is determined that the number of seats corresponding to the total number of votes from the present visitors is greater than the number of seats indicated by the seating capacity of the selected exhibition hall ("YES" at S1707), the operation proceeds to "A" of FIG. 17. More specifically, the presentation recommending unit 35 determines that, based on the total number of votes for a specific exhibit from the currently-visiting visitors that are collected at the current update time, there will be a sufficient number of potential attendees even if a presentation for that exhibit is newly scheduled.

After "A" of FIG. 17, the presentation recommending unit 35 refers to the presentation schedule of each exhibition hall, to determine whether to recommend the exhibitor to have a presentation about the recommended exhibit.

When it is determined that the number of seats corresponding to the total number of votes from the present visitors is not greater than the number of seats indicated by the seating capacity of the selected exhibition hall ("NO" at S1707), at S1708, the presentation recommending unit 35 selects, from the exhibits subject for selection that are obtained from the exhibit collection DB 44, an exhibit having the highest rank in difference in number of votes for all visitors who have voted. More specifically, since the number of potential attendees that is obtained based on the total number of votes for the present visitors is not sufficient, the presentation recommending unit 35 changes a criterion for selecting an exhibit to be recommended for presentation.

At S1709, the presentation recommending unit 35 determines whether a number of seats corresponding to the difference in vote for all visitors who have voted is greater than a number of seats that is indicated by the seating capacity of the selected exhibition hall extracted at S1703. When it is determined that the number of seats corresponding to the difference in vote from all visitors who have voted is greater than the number of seats indicated by the seating capacity of the selected exhibition hall ("YES" at S1709), the operation proceeds to "A" of FIG. 17. More specifically, the presentation recommending unit 35 determines that, based on the total number of votes for a specific exhibit from the visitors, which are collected between the previous update time and the current update time, there will be a sufficient number of potential attendees even if a presentation for that exhibit is newly scheduled.

After "A" of FIG. 17, the presentation recommending unit 35 refers to the presentation schedule of each exhibition hall, to determine whether to recommend the exhibitor to have a presentation about the recommended exhibit.

When it is determined that the number of seats corresponding to the difference in vote is not greater than the number of seats indicated by the seating capacity of the selected exhibition hall ("NO" at S1709), at S1710, the presentation recommending unit 35 selects an exhibit having the highest rank in total number of votes from the visitors who have voted.

After "A" of FIG. 17, the presentation recommending unit 35 refers to the presentation schedule of each exhibition hall, to determine whether to recommend the exhibitor to have a presentation about the recommended exhibit.

The operation of determining whether to recommend to have a presentation about the recommended exhibit, which is performed after "A" of FIG. 17, is described referring to FIG. 18. The recommended exhibit is any exhibit, which is selected at S1705, S1707, S1709, or S1710.

At S1811, the presentation recommending unit 35 refers to the presentation schedule DB 46 (FIG. 16) to determine whether any presentation has been given before the current time or will be given after the current time for the recommended exhibit.

When it is determined that no presentation has been scheduled for the recommended exhibit before or after the current time ("NO" at S1811), the operation proceeds to S1812 to determine to have a presentation about the recommended exhibit.

At S1813, the presentation recommending unit 35 excludes the selected exhibition hall from the exhibition halls to be searched at 1701, as well as the recommended exhibit from the exhibits to be considered at S1704, S1706, S1708, and S1710. The operation then returns to S1701 of FIG. 17 to search for another exhibit to be recommended.

When it is determined that presentation has been scheduled for the recommended exhibit before or after the current time ("YES" at S1811), the operation proceeds to S1814 to determine whether the presentation will be given after the current time. When it is determined that the presentation will not be given after the current time, that is, the presentation has been given before the current time ("NO" at S1814), the operation proceeds to S1815.

At S1815, the presentation recommending unit 35 determines whether the recommended exhibit is selected at S1704 or S1708, based on the difference in vote either from the present visitors (S1704) or the visitors who have voted (S1708). The presentation recommending unit 35 further determines whether the presentation end time of the presentation that has been given for the last time is before the last update time in the vote collection DB 44 (FIG. 13). When it is determined that the recommended exhibit is selected based on the difference in vote, and the presentation end time is before the last update time ("YES" at S1815), the presentation recommending unit 35 determines that there will be a sufficient number of potential attendees even if the presentation is newly scheduled, and the operation proceeds to S1812.

When it is determined that the recommended exhibit is selected based on the total number of votes either from the present visitors or the visitors who have voted, or the presentation end time is after the last update time ("NO" at S1815), the presentation recommending unit 35 determines that there will be not a sufficient number of potential attendees even if the presentation is newly scheduled, and the operation proceeds to S1816.

At S1816, the presentation recommending unit 35 excludes the recommended exhibit, from the exhibits to be considered at S1704, S1706, S1708, and S1710, and the operation returns to S1704 of FIG. 17 to search for exhibit to be recommended for presentation.

Referring back to FIG. 18, when it is determined that the presentation will be given after the current time ("YES" at S1814), the operation proceeds to S1817. At S1817, the presentation recommending unit 35 determines whether a number of seats indicated by the seating capacity of the exhibition hall that is searched and selected at S1703 of FIG. 17 is greater than a number of seats indicated by the seating capacity of the exhibition hall that is booked for the scheduled presentation.

When it is determined that the number of seats for the searched exhibition hall is greater than the number of seats for the booked exhibition hall ("YES" at S1817), at S1818, the presentation recommending unit 35 further determines whether the difference in number of seats between the booked exhibition hall and the searched exhibition hall is equal to or greater than a predetermined number.

If the difference in number of seats is less than the predetermined number, it is not necessary to change the exhibition hall and/or the presentation schedule. Rather, unless there is not much difference in seating capacity, change to the presentation schedule should be kept minimum to avoid any confusion or inconvenience for those visitors who are planning to attend such presentation. In such case ("NO" at S1818), the operation proceeds to S1816.

When it is determined that the difference in number of seats between the booked exhibition hall and the searched exhibition hall is equal to or greater than the predetermined number ("YES" at S1818), the operation proceeds to S1819. At S1819, the presentation recommending unit 35 determines to change the exhibition hall and the presentation schedule for the scheduled presentation on the recommended exhibit, to the exhibition hall and the presentation schedule that are selected at S1703 and S1701. The operation then proceeds to S1813.

When the number of seats for the searched exhibition hall is equal to or less than the number of seats for the booked exhibition hall ("NO" at S1817), or the difference in number of seats between the booked exhibition hall and the searched exhibition hall is less than the predetermined number ("NO" at S1816), the operation proceeds to S1816.

At S1816, the presentation recommending unit 35 excludes the recommended exhibit, from the exhibits to be considered at S1704, S1706, S1708, and S1710, and the operation returns to S1704 of FIG. 17 to search for exhibit to be recommended for presentation.

In the above-described example referring to FIG. 18, at 1818, the presentation recommending unit 35 determines to change the exhibition hall and the presentation schedule, based on the difference in number of seats between the booked exhibition hall and the searched exhibition hall. Alternatively or additionally, the presentation recommending unit may determine whether to change the exhibition hall and the presentation schedule, based on a time period counted up to the scheduled presentation time. For example, even when a large number of visitors who are currently at the exhibition have interests, if the planned scheduled time is changed to a later time, such visitors who have voted may leave by the newly scheduled time. Based on this assumption, the presentation recommending unit 35 may determine not to change the exhibition hall and the presentation schedule, if there will be a difference of more than a few hours between the scheduled presentation time before change and the determined presentation time after change. Accordingly, a sufficient number of attendees can be expected.

Further, even when the presentation recommending unit 35 determines that the difference in number of seats between the booked exhibition hall and the searched exhibition hall is equal to or greater than the predetermined number ("YES" at S1818), if the scheduled presentation time before change does not differ much from the scheduled presentation time after change, the exhibition hall and the presentation schedule for the presentation on the recommended exhibit may remain the same.

In the above-described embodiment, it is assumed that operation of FIGS. 17 and 18 is performed every one hour. Alternatively, operation of FIGS. 17 and 18 may be performed a predetermined time before an available time period. For example, the presentation recommending unit 35 may determine an exhibit to be recommended for presentation, one hour before the available time period that is not booked. In such case, the presentation management server 11 may store the time-based vote collection DB of FIG. 23, which stores a number of votes for each time slot. With the time-based vote collection DB of FIG. 23, the presentation recommending unit 35 can easily obtain the number of votes that have been collected after the last presentation time, to determine whether to recommend to have additional presentation on the recommended exhibit at S1815 based on a difference in vote from the present visitors or the visitors who have voted.

Referring now to FIGS. 13, 15, 16, 17, and 18, the above-described operation of determining an exhibit to be recommended for presentation, performed by the presentation recommending unit 35, is described according to an embodiment. In this embodiment, it is assumed that the update time at which votes are collected for determination of an exhibit to be recommended for presentation is set to 0:00, and the current time is 12:00. Further, it is assumed that the presentation recommending unit 35 searches any exhibition hall that is available for 50 minutes or more, when counted from the time that is one hour to two hours from the current time of 12:00.

At S1701, the presentation recommending unit 35 refers to the presentation schedule DB 46 (FIG. 16) to extract an exhibition hall, which is available for at least 50 minutes when counted from the recommended presentation start time that is between 13:00 and 14:00. In this example, an exhibition hall M and an exhibition hall O are extracted as having an available time.

Further, at S1702, the presentation recommending unit 35 determines that the extracted exhibition halls M and O have not been selected for the exhibit to be recommended for presentation ("YES" at S1702).

At S1703, the presentation recommending unit 35 refers to the exhibition hall DB 45 (FIG. 15) to compare the seating capacity between the exhibition hall M and the exhibition hall O, and selects the exhibition hall M as it has a higher seating capacity.

Accordingly, the presentation recommending unit 35 determines that the exhibition place is the exhibition hall M, and the presentation time is between 13:00 and 14:00. The operation proceeds to determine an exhibit to be recommended for presentation.

First, at S1704, the presentation recommending unit 35 refers to the vote collection DB 44 (FIG. 13) to select an exhibit Q2, which has the highest rank based on the difference in vote for the present visitors.

At S1705, the presentation recommending unit 35 compares between the number of potential attendees that is estimated based on the difference in vote for the present visitors, and the number of seats indicated by the seating capacity of the exhibition hall M. Referring to FIG. 13, the difference in vote (visitor present) for the exhibit Q2 is 82 votes. Referring to FIG. 15, the number of seats for the exhibition hall M is 50 seats. Since the difference in vote (82 votes) is greater than the seating capacity (50 seats), the presentation recommending unit 35 determines that there will be a sufficient number of attendees. The operation then proceeds to operation of FIG. 18.

At S1811, the presentation recommending unit 35 determines whether the presentation on the exhibit Q2 has been given or will be given. Referring to the presentation schedule DB 46 of FIG. 16, the presentation on the exhibit Q2 is scheduled from 16:00 to 16:45 at the exhibition hall O. Accordingly, S1811 is "YES" and S1814 is "YES".

At S1817, the presentation recommending unit 35 determines whether the seating capacity of the exhibition hall M that has been searched is greater than the seating capacity of the exhibition hall O that has been scheduled. In this case, it is determined that the answer is "YES".

Assuming that the predetermined number to be used at S1818 is 10, the presentation recommending unit 35 determines that the difference in seating capacity between the exhibition hall O and the exhibition hall M, which is 20 seats, is greater than the predetermined number of 10 ("YES" at S1818).

At S1819, the presentation recommending unit 35 determines to change, for the presentation on the exhibit Q2, the exhibition hall from the exhibition hall O to the exhibition hall M, and the presentation time from 16:00-16:45 to 13:00-14:00.

At S1813, the presentation recommending unit 35 then excludes the exhibition hall M that has been selected, from the exhibition halls to be considered at S1701. The presentation recommending unit 35 further excludes the exhibit Q2 that has been selected, from the exhibits to be considered at S1704, S1706, S1708, and S1710. The operation then returns to S1701 for further processing.

Through performing S1701 to S1703, the presentation recommending unit 35 selects an exhibition hall O. At S1704, since the exhibit Q2 is excluded from the exhibits to be considered at S1704, the presentation recommending unit 35 selects an exhibit P2 as it has the highest rank in difference in vote for the present visitors. Since the seating capacity of the exhibition hall O (30 seats) is greater than the difference in vote for the present visitors (17 votes) ("NO" at S1705), the operation proceeds to S1706.

At S1706, the presentation recommending unit 35 selects an exhibit Q1 as it has the highest rank in number of votes for the present visitors (Q2 is excluded). At S1707, the presentation recommending unit 35 compares between the total number of votes for the present visitors who have voted for the exhibit Q1, and the seating capacity of the exhibition hall O. Since the total number of votes from the present visitors for the exhibit Q1 is 25, and the seating capacity of the exhibition hall O is 30, ("NO" at S1707) the operation proceeds to S1708 to again change a criterion.

At S1708, the presentation recommending unit 35 selects an exhibit P2 as it has the highest rank in difference in vote from all visitors who have voted (Q2 is excluded). Since the difference in vote from visitors who have voted for the exhibit P2 is 35, and the seating capacity of the exhibition hall O is 30, it is determined that the difference in vote is greater than the seating capacity ("YES" at S1709). The operation then proceeds to FIG. 18 to determine an exhibit P2, as an exhibit to be recommended for presentation at the exhibition hall O between 13:00 to 14:00.

At S1811, the presentation recommending unit 35 refers to the presentation schedule DB 46 (FIG. 16) to determine that the presentation on the exhibit P2 took place between 11:00 to 11:45, such that S1811 is "YES" and S1814 is "NO".

At S1815, the presentation recommending unit 35 determines that the exhibit P2 has the highest rank in difference in vote from the visitors who has voted, and that the last presentation on the exhibit P2 took place after the last update time ("NO" at S1815).

At S1816, the presentation recommending unit 35 excludes the recommended exhibit P2, from the exhibits to be considered at S1704, S1706, S1708, and S1710, and the operation returns to S1704 of FIG. 17 to search for exhibit to be recommended for presentation.

At S1704 and S1705, the presentation recommending unit 35 selects an exhibit R1 having the highest rank in difference in vote for the present visitors, and determines whether the number of seats indicated by the difference in vote for the selected exhibit by the present visitors (8 seats) is greater than the seating capacity of the exhibition hall O (30 seats). In this example, since the seating capacity of the exhibition hall O is greater than the difference in vote from the present visitors ("NO" at S1705), the operation proceeds to S1706.

At S1706 and S1707, the presentation recommending unit 35 selects an exhibit Q1 having the highest rank in total votes for the present visitors (25 votes), and determines whether the number of seats indicated by the total votes for the selected exhibit by the present visitors is greater than the seating capacity of the exhibition hall O (30 seats). In this example, since the seating capacity of the exhibition hall O is greater than total votes from the present visitors ("NO" at S1707), the operation proceeds to S1708.

At S1708, the presentation recommending unit 35 selects an exhibit Q1 as it has the highest rank in difference in vote from all visitors who have voted. However, since the seating capacity of the exhibition hall O (30 seats) is greater than the number of seats indicated by the difference in total votes from all visitors who have voted for the exhibit Q1 (10 votes), the presentation recommending unit 35 determines that there is not exhibit to be recommended at S1709 ("NO" at S1709).

At S1710, the presentation recommending unit 35 selects an exhibit Q1, as it has the highest rank in total votes from all visitors who have voted, and the operation proceeds to FIG. 18.

At S1811, the presentation recommending unit 35 refers to the presentation schedule DB 46 to determine that no presentation on the recommended exhibit Q1 has been scheduled before or after the current time ("NO" at S1811). The operation proceeds to S1812 to determine to recommend to have a presentation on the exhibit Q1, in the selected exhibition hall O. At S1813, the presentation recommending unit 35 excludes the exhibition hall O and the exhibit Q1 from the subject for searching, and the operation returns to S1701 of FIG. 17.

At S1702, the presentation recommending unit 35 determines that there is no exhibition hall that is available for at least 50 minutes when counted from the time between 13:00 to 14:00, which has not been selected to have a newly added presentation, as the exhibition hall M and the exhibition hall O have been both excluded from the search. Accordingly, the operation ends.

As described above, in this example, the presentation recommending unit 35 recommends to have a presentation on the exhibit Q2 at the exhibition hall M between 13:00 to 14:00, and to have a presentation on the exhibit Q1 at the exhibition hall O between 13:00 to 14:00.

Figure 19:
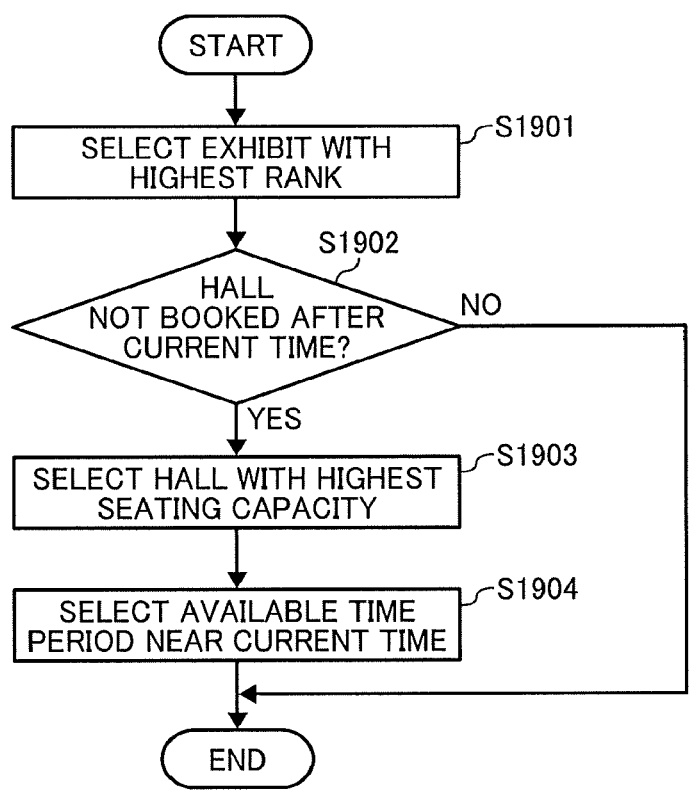
FIG. 19 is a flowchart illustrating operation of selecting an exhibit to be recommended for presentation, performed by the presentation management server of FIG. 3, according to an embodiment of the present invention.

Referring now to FIG. 19, operation of determining an exhibit to be recommended for presentation is described according to an embodiment of the present invention. FIG. 19 is a flowchart illustrating operation of selecting an exhibit to be recommended for presentation based on a result of analysis that is stored in the vote collection DB 44. In this case illustrated in FIG. 19, after selecting the exhibit having the highest rank, the presentation recommending unit 35 selects an exhibition hall to be used for presentation on the selected exhibit.

At S1901, the presentation recommending unit 35 refers to the vote collection DB 44 (FIG. 13) to select, out of all exhibits at the exhibition, an exhibit having the highest rank in difference in vote from present visitors. The exhibit may be selected in various other ways, for example, based on the other criterion such as based on a difference in vote from visitors who have voted or based on a total number of votes.

At S1902, the presentation recommending unit 35 refers to the presentation schedule DB 46 (FIG. 16) to determine whether there is any exhibition hall having a time that is not booked after the current time. In alternative to using the current time as a reference, the presentation recommending unit 35 may use any desired time after the current time, such as any time counted from the time when 2 hours elapses since the current time. When it is determined that there is at least one exhibition hall available ("YES" at S1902), at S1903, the presentation recommending unit 35 refers to the exhibition hall DB 45 (FIG. 15) to select an exhibition hall having a time slot not booked, with the highest seating capacity. In this example, in addition to the exhibition hall, which has the highest seating capacity and is available, the presentation recommending unit 35 may select one or more exhibition halls in an order from the one with higher seating capacity to the one with lower seating capacity. If there is not exhibition hall that is not booked ("NO" at S1902), the operation ends.

At S1904, the presentation recommending unit 35 refers to the presentation schedule DB 46, to select a time slot for the selected exhibition hall, which is closest to the current time. In this example, in addition to the time slot that is closest to the current time, the presentation recommending unit 35 may select one or more time slots in an order from the one with a time slot close to the current time to the one with a time slot far from the current time.

Through the above-described operation of FIG. 19, the presentation recommending unit 35 determines to have a presentation on the exhibit selected at S1901, at the exhibition hall selected at S1903, for the time selected at S1904. The operation of FIG. 19 may be repeated, if there is any other exhibition hall that will be available after the current time, after excluding the selected exhibit and the selected exhibition hall from the search.

The operation of FIGS. 17 to 18, and 19 may be performed in various other ways. For example, even when the presentation recommending unit 35 of the presentation management server 11 sends to the exhibitor a notification, which recommends to give a presentation on the recommended exhibit (determined at S1901) with the recommended presentation schedule, the exhibitor may refuse to give such presentation. For this reason, only after confirmation from the exhibitor to have a presentation on the selected exhibit, the presentation recommending unit 35 may exclude the selected exhibit and the selected exhibition hall, from further consideration.

Further, if the presentation recommending unit 35 receives a response indicating rejection to recommendation for having a presentation on a specific exhibit, the presentation recommending unit 35 does not have to perform S1902 to S1904, as the selected exhibition hall and the selected time may be used for another exhibit to be recommended for presentation, which is to be determined through performing again S1901.

Furthermore, the presentation recommending unit 35 may selectively use the operation of FIGS. 17 and 18, and the operation of FIG. 19. For example, the operation of FIGS. 17 and 18 compares between the number of votes (reflecting the number of potential attendees) and the seating capacity of the exhibition hall, to effectively use the exhibition halls. The operation of FIG. 19 determines an exhibit to be recommended for presentation, based on the number of votes, without comparing with the seating capacity of the exhibition hall. In case the number of visitors who have voted tends to be large relative to the total number of visitors, the operation of FIGS. 17 and 18 can be performed to effectively use the exhibition halls. On the other hand, in the case the number of visitors who have voted tends to be small relative to the total number of visitors, the operation of FIG. 19 can be performed to make sure that there is a sufficient room for the visitors who have not voted.

Figure 20:
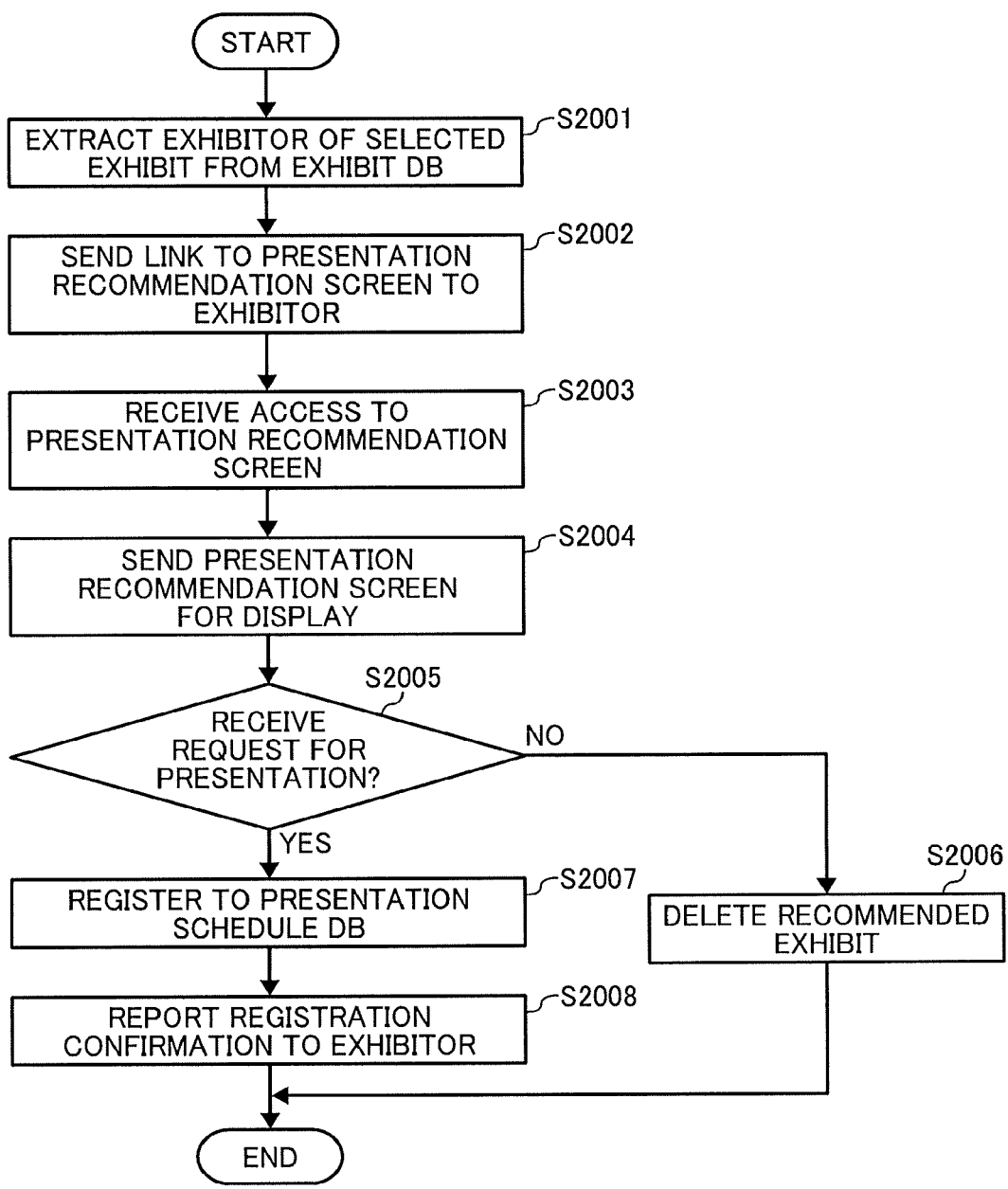
FIG. 20 is a flowchart illustrating operation of sending a notification, with a recommendation to have a presentation, performed by the presentation management server of FIG. 3, according to an embodiment of the present invention.

Referring to FIG. 20, operation of sending a notification to have a presentation on the selected exhibit, performed by the presentation recommending unit 35, is described according to an embodiment of the present invention.

At S2001, the presentation recommending unit 35 extracts, from the exhibit DB 47 (FIG. 6), an exhibit ID of the recommended exhibit and an email address of the exhibitor in charge of the recommended exhibit.

At S2002, the presentation recommending unit 35 generates an email including a link to the URL of a presentation recommendation screen, and sends the generated email to the exhibitor email address that is extracted at S2001.

As the exhibitor at the exhibitor terminal 13 receives the email, and selects the URL of the presentation recommendation screen, at S2003, the presentation recommending unit 35 detects a request for access to the presentation recommendation screen.

At S2004, the presentation recommending unit 35 generates the presentation recommendation screen to the exhibitor terminal 13 for display, and transmits the presentation recommendation screen, for example, in response to a request from the exhibitor terminal 13 that indicates acceptance of the recommendation.

Figure 21:
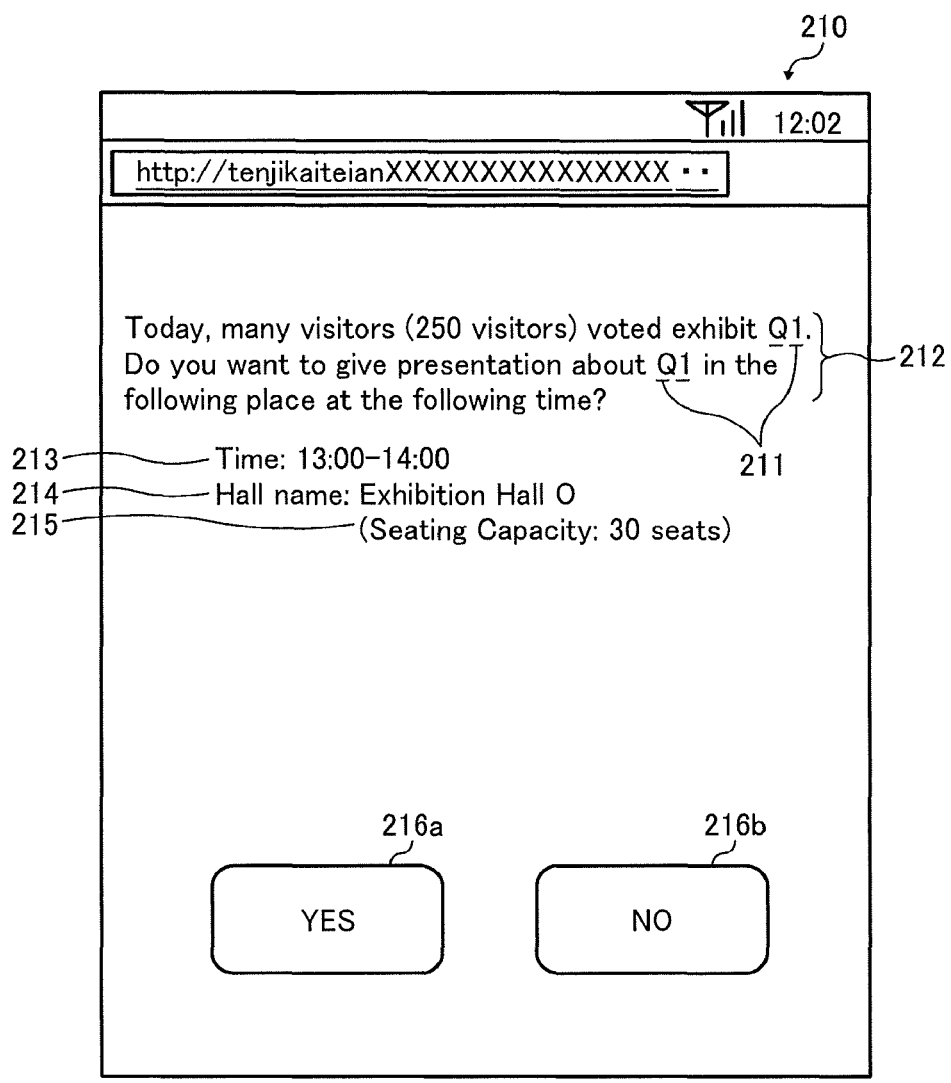
FIG. 21 is an illustration of an example presentation recommendation screen.

FIG. 21 illustrates an example presentation recommendation screen 210. The presentation recommendation screen 210 includes an exhibit ID 211, which is determined through the operation of FIGS. 17 and 18 or the operation of FIG. 19. The presentation recommendation screen 210 further includes an exhibit name or an exhibit item, and explanation 212 about how the exhibit is selected such as information regarding a number of votes. For example, such explanation 212 may differ depending on a specific criterion to be used in selecting the exhibit either at S1704, S1706, S1708, or S1710. The presentation recommendation screen 210 further includes the selected presentation time 213, the exhibition hall name 214, and the seating capacity 215 of the selected exhibition hall that can be obtained from the exhibition hall DB 45 (FIG. 15). The presentation recommendation screen 210 further includes the "YES" key 216*a* to be selected when accepting the presentation offer, and the "NO" key 216*b* to be selected when rejecting the presentation offer. The presentation recommendation screen 210 is displayed, when the presentation is newly added.

More specifically, in this embodiment, the presentation management server 11 stores in any desired memory such as the RAM 22 (FIG. 2), data of a presentation recommendation screen with no information, such as a frame of the presentation recommendation screen indicating the layout. Through inputting information that is obtained through the operation of determining the exhibit to be recommended for presentation, etc. (as described above referring to FIGS. 17 and 18 or the operation of FIG. 19), the presentation recommending unit 35 generates the presentation recommendation screen 210.

Figure 22:
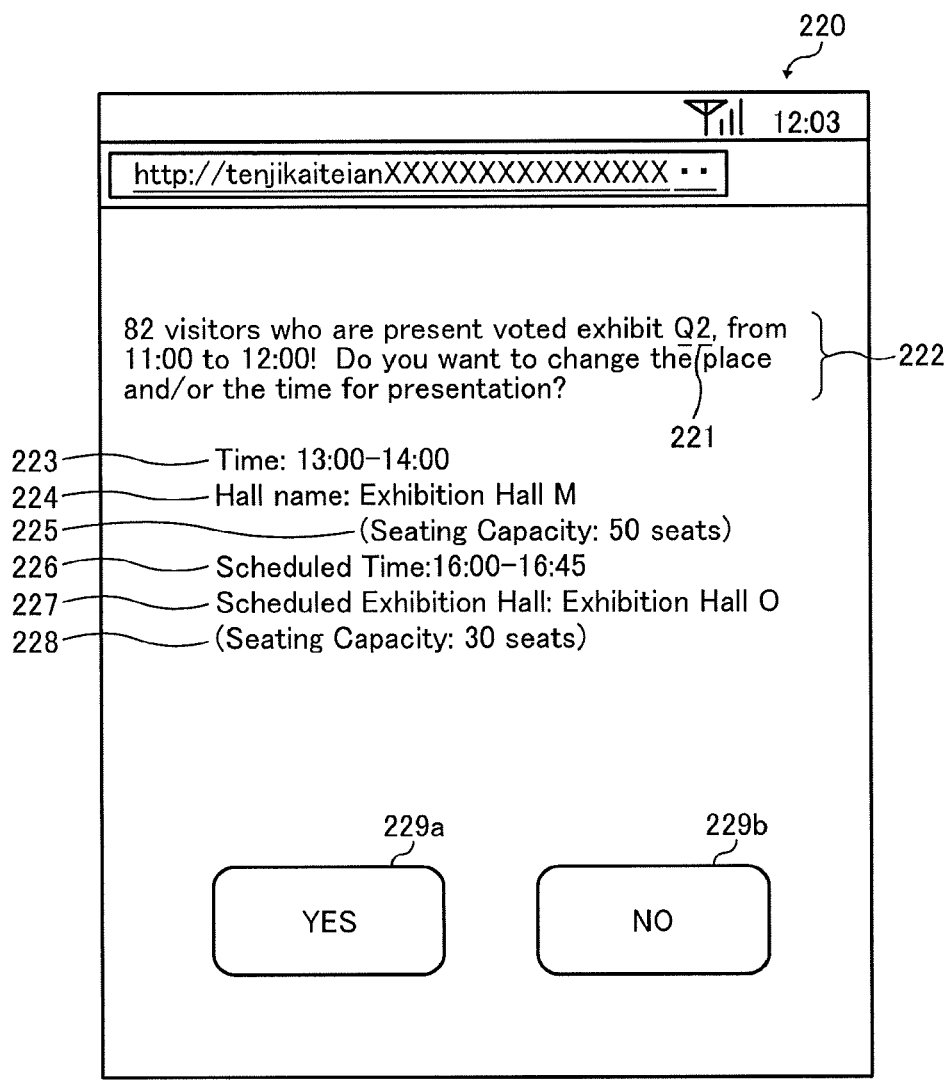
FIG. 22 is an illustration of an example presentation recommendation screen.

More specifically, referring to FIG. 21, the presentation recommending unit 35 inputs the exhibit ID of the selected exhibit that is extracted from the vote collection DB 44 (FIG. 13), to the input fields 211 ("Q1" is illustrated in FIG. 21). The presentation recommending unit 35 selects a specific sentence to be displayed as the explanation 212 based on a specific criterion used for selecting the recommended exhibit. For instance, the screen 210 of FIG. 22 illustrates the case where the recommended exhibit is selected, which has the greatest total number of votes collected from the visitors, at S1710 of FIG. 17. In such case, the total number of votes (in this case, 250), which is obtained from the vote collection DB 44 for the recommended exhibit (in this case, Q1), is input.

The presentation recommending unit 35 further inputs, in the time field 213, the recommended time that is selected at S1701. The presentation recommending unit 35 inputs in the field 214 the name of the selected exhibition hall that is selected at S1703 and obtained from the exhibition hall data DB 45 (FIG. 15), and further inputs in the field 215 a seating capacity of the selected exhibition hall obtained from the exhibition hall data DB 45 (FIG. 15).

For the presentation that is recommended to modify its presentation schedule, the presentation recommending unit 35 displays a presentation recommendation screen 220 of FIG. 22. The presentation schedule may be modified as described above referring to S1819 of FIG. 18.

The presentation recommendation screen 220 includes an exhibit ID 221, which is the exhibit subject for change in presentation schedule, and an exhibit name or an exhibit item. The presentation recommendation screen 220 further includes explanation 222 about how the exhibit is selected such as information regarding a number of votes. The explanation 222 may differ depending on a specific criterion to be used in selecting the exhibit either at S1704, S1706, S1708, or S1710. In this example illustrated in FIG. 22, the explanation 222 includes information regarding a number of votes ("82 visitors") from the present visitors ("who are present"), which are received from 11:00 to 12:00, as calculated by the vote result analyzer 34. The presentation recommendation screen 220 further includes a newly proposed time 223, a newly proposed exhibition hall name 224, a previously scheduled time 226 that has been stored in the presentation schedule DB 46 (FIG. 16), and a previously scheduled exhibition hall name 227. The presentation recommendation screen 220 further includes the seating capacity 225 for the newly proposed exhibition hall, and the seating capacity 228 for the previously scheduled exhibition hall. The presentation recommendation screen 220 further includes the "YES" key 229*a* for accepting the change, and the "NO" key 229*b* for rejecting the change.

The presentation recommendation screen 220 is generated in a substantially similar manner as described above for the case of the presentation recommendation screen 210 of FIG. 21. For the scheduled time 226 and the scheduled exhibition hall 227, the presentation recommending unit 35 accesses the presentation schedule DB 46 to obtain information.

Referring back to FIG. 20, at S2005, the presentation recommending unit 35 receives a response from the exhibitor terminal 13, which indicates whether to accept or reject recommendation to add the new presentation through the presentation recommendation screen 210, or recommendation to change the presentation schedule through the presentation recommendation screen 220. When the presentation recommending unit 35 receives the response indicating rejection to recommendation to add or modify ("NO" at S2005), the operation proceeds to S2006 to delete the recommended exhibit, and further repeat operation of selecting an exhibit as described above referring to FIGS. 17 and 18 or FIG. 19.

When the presentation recommending unit 35 receives the response indicating acceptance to recommendation to add or modify ("YES" at S2005), the operation proceeds to S2007. More specifically, in the case of adding a new presentation on the recommended exhibit, the presentation recommending unit 35 registers, in the presentation schedule DB 46, the exhibit ID of the recommended exhibit, the place for presentation, and the presentation time. In the case of modifying the presentation schedule for the recommended exhibit, the presentation recommending unit 35 replaces the previously stored presentation information in the presentation schedule DB 46, with new presentation information.

When registration to the presentation schedule DB 46 completes, at S2008, the presentation recommending unit 35 sends a notification indicating completion of registration, to the email address of the exhibitor in charge of the recommended exhibit. If the exhibit registration terminal 12 is installed with the dedicated application, the presentation recommending unit 35 may use the push function of the dedicated application to send any one of the above-described notifications to the exhibitor, such as the notification on recommendation for presentation or the notification on completion of registration.

As described above, in case any one of the exhibition halls at the exhibition has a time that is not booked, the presentation management server 11 is able to automatically recommend the exhibitor to have one or more presentations on one or more exhibits based on the needs from the visitors at the exhibition. Accordingly, the organization operating the exhibition is able to manage a presentation schedule such that the exhibition halls can be effectively used.

More specifically, in some embodiments, the presentation management server 11 analyzes vote information that is constantly obtained every predetermined time period or according to a request. The presentation management server 11 selects an exhibit to be recommended for presentation based on analysis. The presentation management server 11 further determines a recommended presentation time for having the presentation on the selected exhibit, based on presentation schedule information for the selected exhibit. The presentation management server 11 further selects an exhibition place for having such presentation based on the presentation schedule information. The presentation management server 11 generates a presentation recommendation screen including information regarding the selected exhibit, the recommended presentation time, and the selected exhibition place, for output to an exhibitor terminal operated by the exhibitor of the selected exhibit. Since the presentation management server 11 automatically analyzes the collected votes, and generates a presentation recommendation screen based on analysis in a manner that is interpretable by the exhibitor, there will be no need for the organization exhibitor to intervene the process of analyzing, finding out an exhibit to be recommended for presentation, finding out a presentation time, or finding out an exhibition hall for presentation.

Further, in some embodiments, the presentation manager server 11 may further obtains visitor presence information indicating whether the visitor who has voted is currently present or not at the exhibition. Based on such visitor presence information, the presentation management server 11 may only consider those who are currently at the exhibition in analyzing the votes. The resultant analysis may reflect the current needs from the visitors with improved accuracy.

Further, the presentation management server 11 changes the presentation schedule, either by adding a new presentation or changing the presentation schedule (including time/place) for the scheduled presentation, based on a response accepting such recommendation from the exhibitor. More specifically, the presentation recommendation screen further includes a key for allowing the exhibitor to accept or reject the recommendation. Accordingly, the presentation schedule reflects the needs from the exhibitor.

Further, the exhibitor in charge of the exhibit, is able to know how many visitors have interests on that exhibit in real time. If a sufficient number of visitors who are currently at the exhibition have interests, the presentation management server 11 is able to automatically recommend the exhibitor to have a presentation on that exhibit, at appropriate exhibition hall and at appropriate time. More specifically, the presentation recommendation screen further includes information regarding an estimate number of visitors who will attend the presentation if the presentation takes place, such as a number of votes collected from the present visitors. Accordingly, the exhibitor is able to effectively introduce the exhibit to those visitors who have interests.

For example, the presentation management server 11 selects an exhibit having the highest number of votes from the visitors currently at the exhibition for recommendation. Further, the presentation time may be determined to be a time within a predetermined time period, which is counted from the last update time when the votes are collected for analysis.

Further, the presentation place, such as the exhibition hall, may be determined based on a number of potential attendees that can be estimated based on a number of votes from the visitors, particularly, the visitors currently at the exhibition. This facilitates the effective use of the exhibition hall.

Referring now to FIGS. 24 to 31, operation of managing presentation schedule, performed by the presentation management server 11, is described according to an embodiment of the present invention. In this embodiment, the exhibitor is charged for having a presentation on the exhibit.

Figure 24:
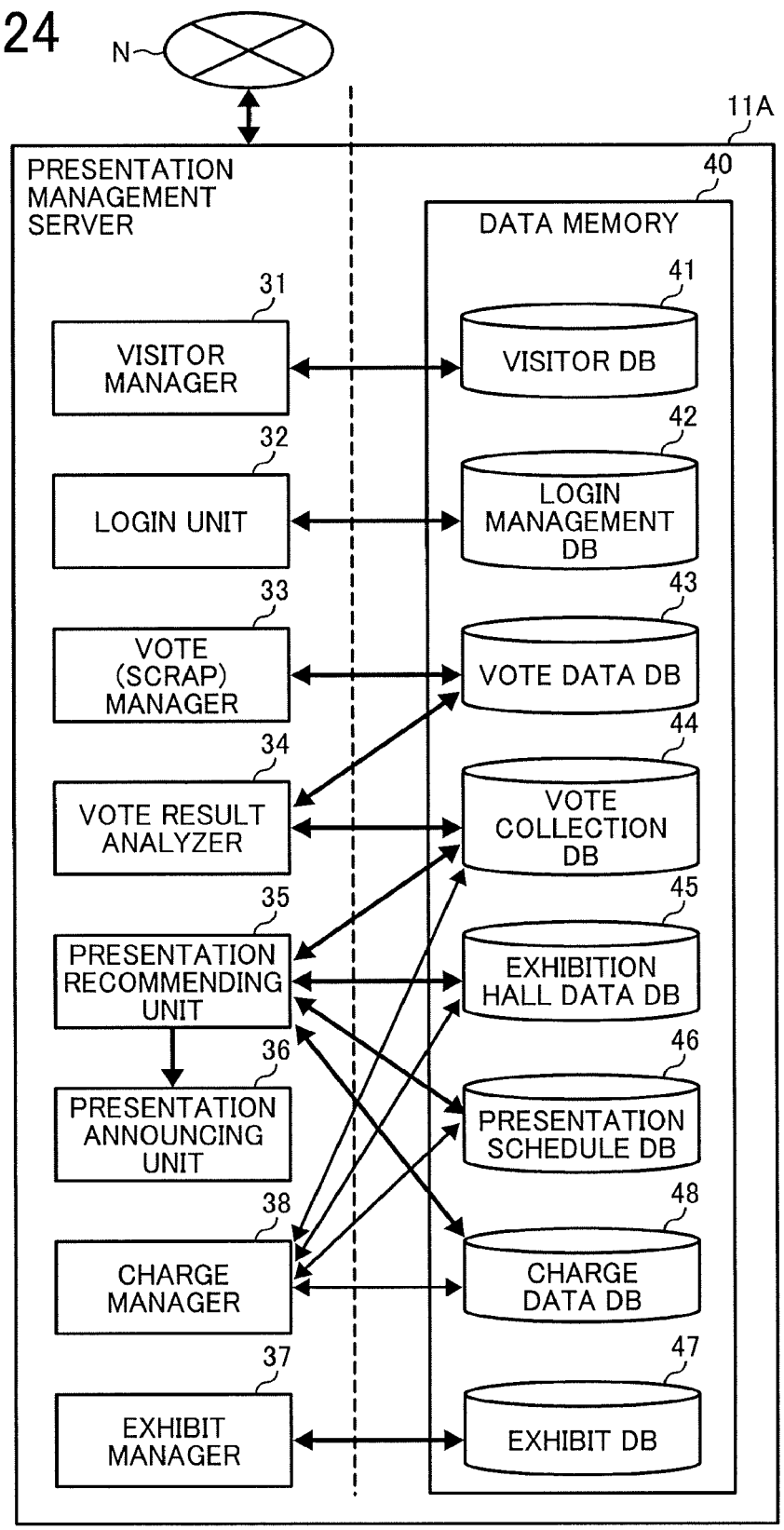
FIG. 24 is a schematic block diagram illustrating a functional configuration of the presentation management server of FIG. 3, according to an embodiment of the present invention.

FIG. 24 is a schematic block diagram illustrating a functional configuration of the presentation management server 11 of FIG. 1 in this embodiment. The presentation management server 11A of FIG. 24 additionally includes a charge manager 38 and a charge data DB 48. The charge manager 38 refers to the charge data DB 48 to calculate an amount of charge for the exhibitor who has given a presentation on the exhibit.

FIG. 25 is an example data structure of charge data DB, which stores, for each exhibitor at the exhibition, a name of the exhibitor and an additional charge fee due to the change or addition of a presentation schedule.

Figure 26:
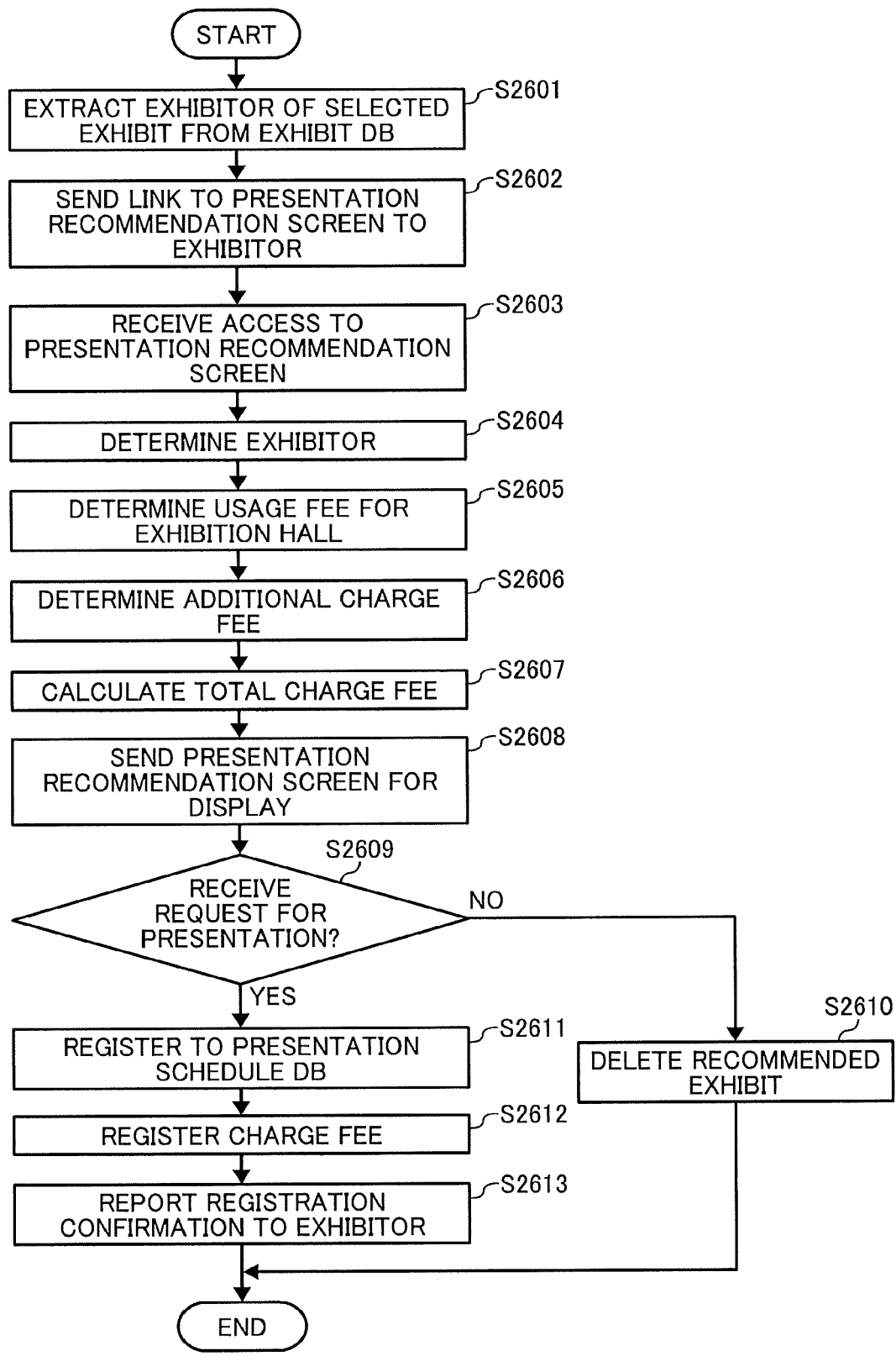
FIG. 26 is a flowchart illustrating operation of sending a notification, with a recommendation to have a presentation on an exhibit, performed by the presentation management server of FIG. 24, according to an embodiment of the present invention.

Referring to FIG. 26, operation of sending a notification to have a presentation on the exhibit, performed by the presentation recommending unit 35, is described according to the embodiment. The operation of FIG. 26 is performed after determining the exhibit to be recommended for presentation, as described above referring to FIGS. 17 and 18, or FIG. 19.

At S2601, the presentation recommending unit 35 refers to the exhibit DB 47 (FIG. 27) to extract the email address of the exhibitor in charge of the recommended exhibit.

At S2062, the presentation recommending unit 35 generates an email including a link to the URL of a presentation recommendation screen, and sends the generated email to the exhibitor email address that is extracted at S2061.

As the exhibitor at the exhibitor terminal 13 receives the email, and selects the URL of the presentation recommendation screen, at S2603, the presentation recommending unit 35 detects a request for access to the presentation recommendation screen.

At S2604, the presentation recommending unit 35 refers to the exhibit DB 47 (FIG. 27) to determine an exhibitor who will have a presentation on that exhibit. FIG. 27 illustrates an example data structure of the exhibit DB 47 in this embodiment. The exhibit DB 47 of FIG. 27 additionally stores information regarding each exhibitor in charge of the exhibit.

At S2605, the presentation recommending unit 35 refers to the exhibition data DB (FIG. 28) to obtain a usage fee for using the exhibition hall, which will be charged to the exhibitor. FIG. 28 illustrates an example data structure of the exhibition hall data DB 45 in this embodiment. The exhibition hall data DB 45 of FIG. 28 additionally stores information regarding the usage fee (charge fee) to be charged for using the exhibition hall.

At S2606, the presentation recommending unit 35 refers to the charge data DB 48 (FIG. 25) to obtain the current value of an additional charge fee to be charged to the exhibitor. The exhibitor in this embodiment is determined to have the exhibitor as determined at S1704, S1706, S1708, S1710 of FIG. 17, or S1901 of FIG. 19.

At S2607, the presentation recommending unit 35 calculates a total charge fee, by adding the usage fee (charge fee) obtained at S2605 to the additional charge fee obtained at S2606.

Figure 29:
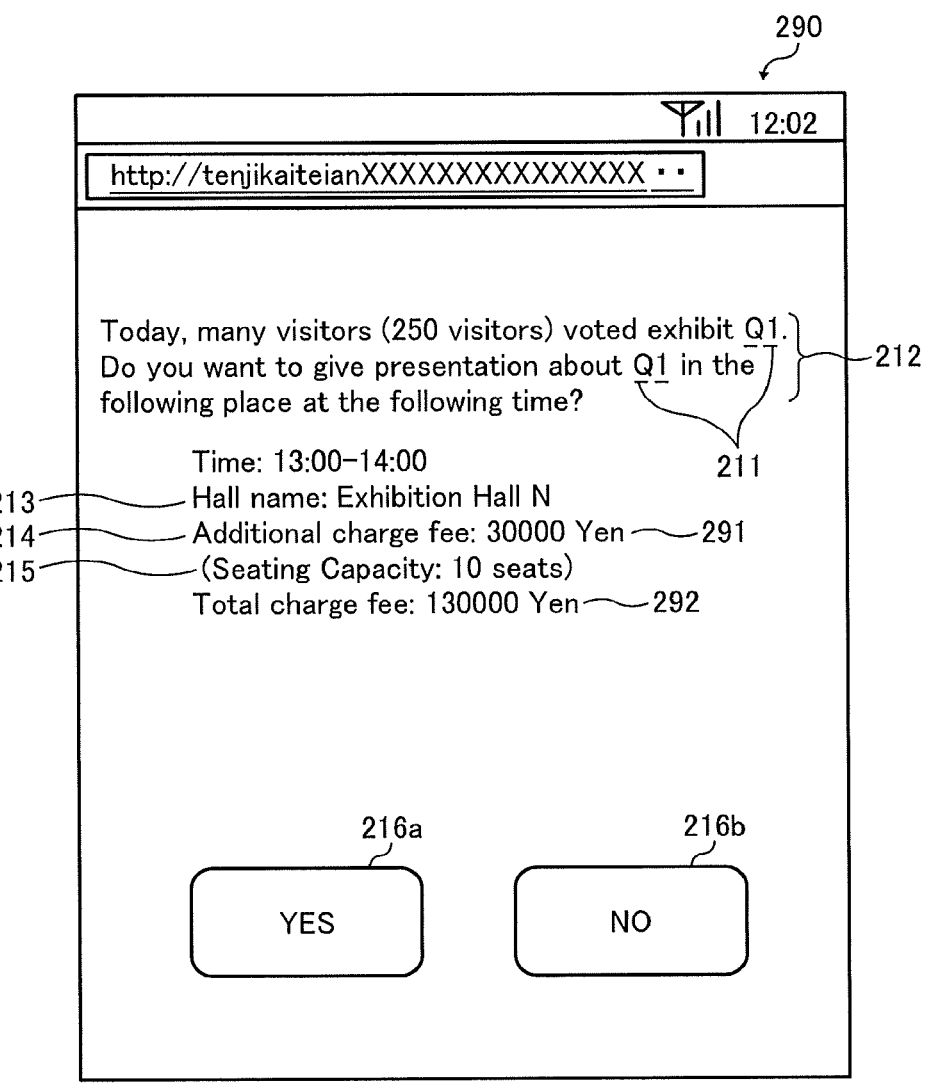
FIG. 29 is an illustration of an example presentation recommendation screen.

At S2608, the presentation recommending unit 35 generates a presentation recommendation screen 290 based on the usage fee obtained at S2605, and the total charge fee obtained at S2607, for example, as illustrated in FIG. 29. The presentation recommending unit 35 further transmits the presentation recommendation screen 290 to the exhibitor terminal 13 for display.

Referring to FIG. 29, the presentation recommendation screen 290 includes an exhibit ID 211, exhibit name or exhibit item, and explanation 212. The exhibit ID 211 identifies the exhibitor, which is selected through the operation of FIGS. 17 and 18, or FIG. 19. The explanation 212 indicates how the exhibit is selected such as information regarding a number of votes, which explains a specific criterion to be used in selecting the exhibit either at S1704, S1706, S1708, or S1710 of FIG. 17, or S1901 of FIG. 19. The presentation recommendation screen 290 further includes the selected presentation time 213, the exhibition hall name 214, the seating capacity 215 of the selected exhibition hall that can be obtained from the exhibition hall DB 45 (FIG. 28), the additional charge fee obtained at S2605, and the total charge fee 292 obtained at S2607. The presentation recommendation screen 290 further includes the "YES" key 216a to be selected when accepting the presentation offer, and the "NO" key 216b to be selected when rejecting the presentation offer. The presentation recommendation screen 290 is displayed, when the presentation is newly added.

For the presentation that is recommended to modify its presentation schedule, the presentation recommendation unit 35 displays a presentation recommendation screen that is similar to the presentation recommendation screen 220 of FIG. 22. In this example, the presentation recommendation screen further includes the additional charge fee obtained at S2605, and the total charge fee obtained at S2607.

Referring back to FIG. 26, at S2609, the presentation recommending unit 35 receives a response from the exhibitor terminal 13, which indicates whether to accept or reject recommendation to add the new presentation through the presentation recommendation screen 290, or recommendation to change the presentation schedule through the presentation recommendation screen. When the presentation recommending unit 35 receives the response indicating rejection to recommendation to add or modify ("NO" at S2609), the operation proceeds to S2610 to delete the recommended exhibit, and further repeats operation of selecting an exhibit as described above referring to FIGS. 17 and 18 or FIG. 19.

When the presentation recommending unit 35 receives the response indicating acceptance to recommendation to add or modify ("YES" at S2609), the operation proceeds to S2611 to update the presentation schedule DB 46 (FIG. 16).

At S2612, the presentation recommending unit 35 updates the charge data DB 48 to reflect a new additional charge fee, which is obtained by adding the usage fee for using the selected exhibition hall to the additional charge fee.

When registration to the presentation schedule DB 46 and the charge data DB 48 completes, At S2613, the presentation recommending unit 35 sends a notification indicating completion of registration, to the email address of the exhibitor in charge of the recommended exhibit. If the exhibit registration terminal 12 is installed with the dedicated application, the presentation recommending unit 35 may use the push function of the dedicated application to send any one of the above-described notifications to the exhibitor, such as the notification on recommendation for presentation, the notification on charge fee, or the notification on completion of registration.

Figure 30:
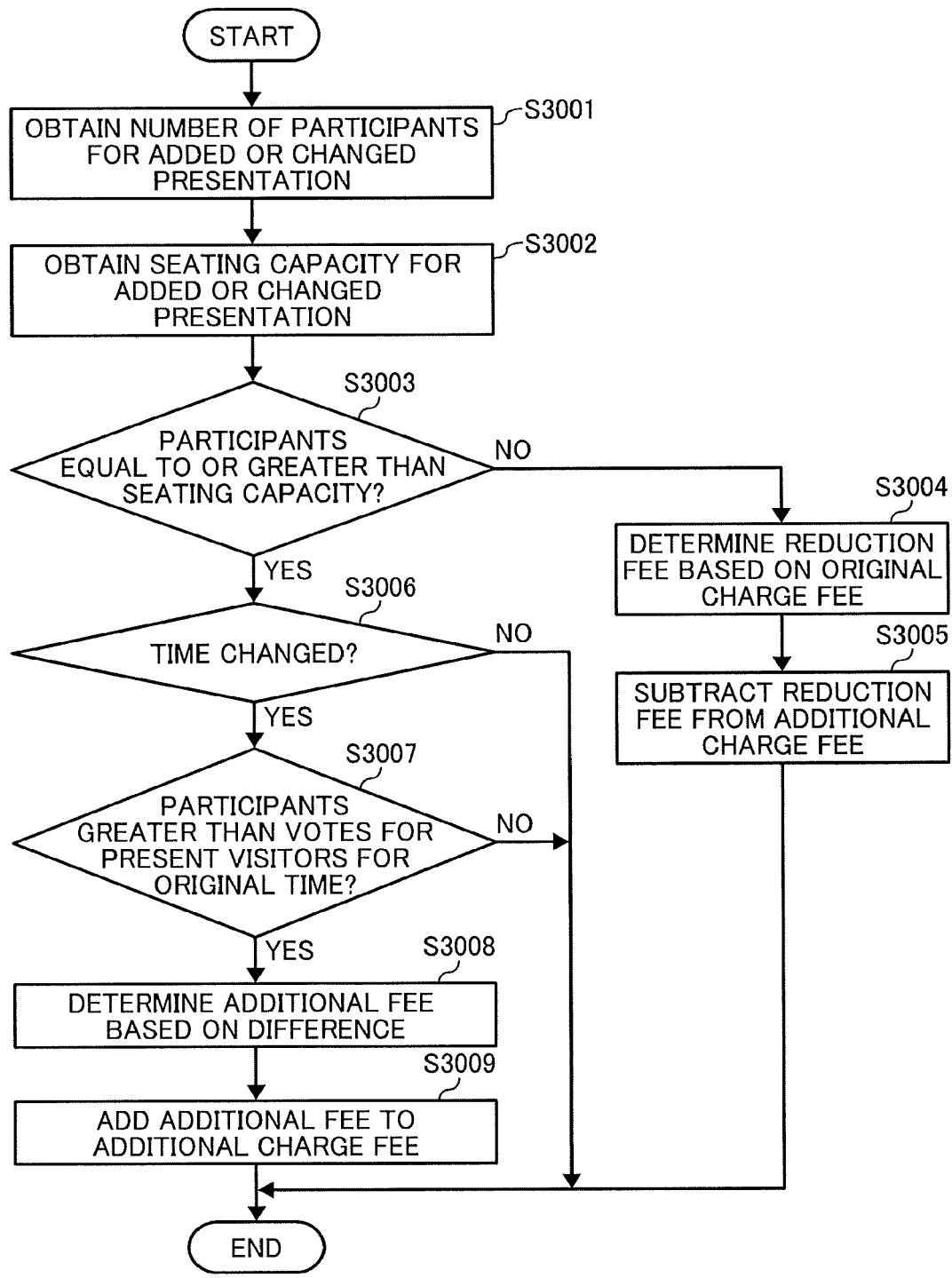
FIG. 30 is a flowchart illustrating operation of calculating a charge fee, performed by the presentation management server of FIG. 24, according to an embodiment of the present invention.

Referring to FIG. 30, operation of updating the charge fee due to addition or modification of the presentation schedule, performed by the charge manager 38 of the presentation management server 11A, is described according to an embodiment of the present invention.

In this embodiment, the charge manager 38 receives a notification indicating attendance to the presentation from the visitor terminal 14, when the visitor enters the exhibition hall to attend the presentation. Based on collected notifications, the charge manager 38 calculates a total number of visitors who attend the presentation, and stores the calculated number of visitors in the presentation schedule DB 46 as illustrated in FIG. 31. The presentation schedule DB 46 of FIG. 31 is substantially similar to the presentation schedule DB 46 (FIG. 16), except for addition of a number of visitors who have attended for the presentations in the past (In FIG. 31, any presentation before 14:00).

At S3001, the charge manager 38 refers to the presentation schedule DB 46 (FIG. 31) to obtain a number of visitors at the presentation, which has been added or modified.

At S3002, the charge manager 38 refers to the exhibition hall data DB 45 (FIG. 28) to obtain the seating capacity for the presentation, which has been added or modified.

At S3003, the charge manager 38 compares between the number of visitors at the presentation that is obtained at S3001, and the number of seats indicated by the seating capacity that is obtained at S3002, to determine whether the number of visitors attending the presentation is equal to or greater than the number of seats, for example, by a predetermined percentage. When it is determined that the number of visitors attending the presentation is less than the number of seats ("NO" at S3003), the charge manager 38 determines to reduce the charge fee, and the operation proceeds to S3004. The charge fee is reduced, since the number of visitors are less than expected. At S3004, the charge manager 38 determines an amount of reduction ("reduction fee"), based on a ratio of a number of visitors attending the presentation to the seating capacity, and the usage fee (charge fee) for using the exhibition hall that is obtained from the exhibition hall data DB 45 (FIG. 31). At S3005, the charge manager 38 subtracts the calculated reduction fee, from the current additional charge fee to be charged to the exhibitor in the charge data DB 48 (FIG. 24).

When it is determined that the number of visitors attending the presentation is equal to or greater than the number of seats ("YES" at S3003), at S3006, the charge manager 38 determines whether the target presentation is the presentation having the presentation schedule modified. When it is determined that the target presentation is not the presentation having the presentation schedule modified, such that it is newly added ("NO" at S3006), the operation ends. When it is determined that the target presentation is the presentation having the presentation scheduled modified ("YES" at S3006), the operation proceeds to S3007.

At S3007, the charge manager 38 refers to the vote collection DB 44 (FIG. 13) to obtain a number of votes from the present visitors at the presentation start time before the change or at the presentation end time before the change. The charge manager 38 determines whether the number of visitors attending the presentation is equal to or greater than the number of votes from the visitors who are present by a predetermined number. When it is determined that the number of visitors attending the presentation is equal to or greater than the number of votes ("YES" at S3007), the operation proceeds to S3008. At S3008, the charge manager 38 determines an additional fee, based on a difference between the number of votes from the present visitors and the number of visitors attending the presentation. At S3009, the charge manager 38 adds the calculated additional fee, to the current additional charge fee to be charged to the exhibitor in the charge data DB 48 (FIG. 24). When it is determined that the number of visitors attending the presentation is less than the number of votes ("NO" at S3007), the operation ends.

As described above, in this embodiment, the presentation management server 11A recommends the exhibitor to have a presentation on a specific exhibit based on the current needs from the visitors, and charges a fee for giving such presentation based on recommendation. Accordingly, an organization operating the exhibition is able to charge an additional fee to the exhibitor for providing the service of recommending a presentation based on the current need from the visitors. Further, the organization operating the exhibition can effectively charge a fee, which reflects the effectiveness of having a presentation.

For example, when such recommendation for adding or modifying the presentation effectively increases the number of visitors attending the presentation, the presentation management server 11A increases the charge fee to be charged to the exhibitor. In some embodiments, the presentation management server 11A determines an amount of charge fee, based on a difference in a number of visitors who attend the presentation and a number of votes from the visitors obtained before the schedule change.

Further, as described above referring to FIGS. 17 and 18, the presentation management server 11A selects an exhibition hall based on a number of potential attendees, which is obtained from analysis of votes. Accordingly, the exhibitor is not charged with relatively a high charge fee for using a large exhibition hall, when only a small number of visitors attend the presentation given in such large exhibition hall.

Furthermore, in case there is only a small number of attendees at the presentation that is given based on recommendation, the exhibitor is charged with relatively a low charge fee. This will make easier for the exhibitor to accept recommendation for having a new presentation or changing the presentation schedule from the presentation management server 11A. If it is easier for the exhibitor to accept recommendation, the organization operating the exhibition can easily fills up all of the exhibition halls to effectively use the exhibition halls.

The presentation management server 11A transmits information regarding the additional charge fee to the exhibitor terminal 13 for display to the exhibitor, when recommending to have a presentation. More specifically, the presentation recommendation screen is generated so as to additionally include information regarding the additional charge fee. Based on this information regarding the additional charge fee, the exhibitor can easily make a decision on whether to accept recommendation.

The illustrated server apparatuses in the presentation management system 1 are only illustrative of one of several computing environments for implementing the embodiments disclosed herein. For example, in some embodiments, the presentation management server 11 or 11A includes a plurality of computing devices, e.g., a server cluster, that are configured to communicate with each other over any type of communications link, including a network, a shared memory, etc. to collectively perform the processes disclosed herein. Similarly, the visitor management server 16 can include a plurality of computing devices that are configured to communicate with each other.

For example, the presentation management server 11 or 11A may be divided into a vote management server including the vote manager 33, the vote data DB 43, and the exhibit DB 47, and the other server (presentation management server) including the rest of functions illustrated in FIG. 3. The vote management server receives votes respectively from the visitors, analyzes the votes, and transmits the analysis result on the votes to each exhibitor as feedback. More specifically, the vote manager 33 receives votes from the visitors, and registers the collected votes to the vote data DB 43. The vote manager 33 transmits information regarding votes to each exhibit, to the exhibitor email address that is associated with the exhibitor ID in the exhibit DB 47.

In some embodiments, the vote management server may additionally include the vote result analyzer 34 and the vote collection data DB 44. In such case, the vote manager 33 reads, from the vote collection DB 44, the result of votes that is generated through analysis by the vote result analyzer 34 based on information stored in the vote data DB 43. The vote manager 33 further transmits the read result of votes to the exhibitor email address.

In some embodiments, the presentation management server 11 or 11A (or the vote management server) may not be provided with the vote data DB 43. In such case, the presentation management server 11 or 11A obtains information regarding votes to each exhibit, using voting services on the web. For example, any desired service with a posting function, such as services provided through Facebook (Registered trademark) or Twitter (Registered trademark), may be used to collect votes. For example, the visitor sends posting to the web-based service, with a tag for identifying the exhibit. The presentation management server 11 or 11A searches for the postings with the tag for identifying the exhibit, and obtains the searched postings as votes for that exhibit.

In some embodiments, the exhibition hall data DB 45 and the presentation schedule DB 46 of the presentation management server 11 or 11A may be implemented as a separate server, which may be managed by an organization managing the exhibition.

Further, each of the plurality of computing devices is configured to communicate with one or more external computing devices using any type of communication link, including any combination of wired and wireless communication links; using any type of network, including the Internet, a wide-area network (WAN), a local-area network (LAN), and a virtual private network (VPN); and using any combination of transmission techniques and communication protocols.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the above-described operation of selecting an exhibit to be recommended for presentation may be performed in various other ways based on analysis of vote information.

Further, the above-described visitor terminal 14 does not have to be owned by each visitor, as long as each visitor can be identified through the visitor terminal 14.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A method of managing presentation of a plurality of exhibits at an exhibition, the method comprising:
   storing, in a memory, presentation schedule information indicating, for each one of a plurality of presentations to be given at the exhibition, an exhibit to be presented and a presentation time for presenting the exhibit, wherein the exhibit includes a tag attached to the exhibit;
   analyzing, by a presentation management server, vote information, the vote information indicating, for each exhibit of the plurality of exhibits at the exhibition, a plurality of votes that has been electronically received for the exhibit from a plurality of visitors who has voted for the exhibit, each vote being input to a visitor terminal operated by each visitor by the visitor terminal reading the tag attached to the exhibit and transmitting information read from the tag to the presentation management server;
   analyzing visitor presence information, the visitor presence information indicating whether each visitor who has voted for the exhibit is currently present at the exhibition;
   selecting, from among the plurality of exhibits at the exhibition, a particular exhibit to be recommended for presentation based on analysis of the vote information, wherein the selecting step further comprises selecting the exhibit to be recommended for presentation based on analysis of the vote information and the visitor presence information indicating whether each visitor who has voted for the exhibit is currently present at the exhibition;
   determining a recommended presentation time for having a presentation on the selected exhibit based on the presentation schedule information;
   generating a presentation recommendation screen including a recommendation to have a presentation on the selected exhibit at the recommended presentation time and transmit the presentation recommendation screen to an exhibitor terminal operated by an exhibitor of the selected exhibit recommended for presentation for display on the exhibitor terminal;
   updating the presentation schedule information stored in the memory to schedule the presentation on the selected exhibit at the recommended presentation time, based on a response from the exhibitor terminal indicating acceptance of the recommendation; and
   notifying the updated presentation schedule information to the plurality of visitors y transmitting an electronic notification to each visitor terminal of the plurality of visitors for display on the visitor terminal.

2. The method of claim 1, wherein the presentation schedule information further indicates, for each one of the plurality of presentations to be given at the exhibition, one of a plurality of exhibition places where the presentation is to be given, the method further comprising:
   selecting one of the plurality of exhibition places that is not scheduled at the recommended presentation time based on the presentation schedule information, as an exhibition place to be used for having the presentation on the selected exhibit at the recommended presentation time,
   wherein the presentation recommendation screen further includes the selected exhibition place.

3. The method of claim 2, further comprising:
   estimating a number of visitors who will attend the presentation if the presentation on the selected exhibit is scheduled at the recommended presentation time, based on the analysis of the vote information;
   obtaining a seating capacity of the selected exhibition place; and
   determining whether the estimated number of visitors who will attend is greater than the obtained seating capacity of the selected exhibition place,
   wherein the generating step further comprises generating the presentation recommendation screen based on a determination indicating that the estimated number of visitors who will attend is greater than the obtained seating capacity of the selected exhibition place.

4. The method of claim 1, further comprising:
   receiving a notification indicating an entry to or an exit from the exhibition, for each visitor who has visited the exhibition; and
   updating the visitor presence information based on the received notification.

5. The method of claim 1, wherein the step of analyzing the vote information is performed every predetermined time period such that a result of analysis is obtained at least at a first time and a second time, the method further comprising:
   calculating, for each exhibit of the plurality of exhibits at the exhibition, a difference in number of votes that have been collected from one or more visitors between the first time and the second time, based on the vote information; and
   selecting one of the plurality of exhibits having a greatest difference in number of votes, as the particular exhibit to be recommended for presentation.

6. The method of claim 1, further comprising:
   calculating, for each exhibit of the plurality of exhibits at the exhibition, a total number of votes that have been collected from one or more visitors, based on the vote information; and
   selecting one of the plurality of exhibits having the greatest total number of votes, as the particular exhibit to be recommended for presentation.

7. The method of claim 1, wherein the step of determining the recommended presentation time includes:
   obtaining one or more time periods during which any one of a plurality of exhibition places at the exhibition is not scheduled with any presentation; and
   setting one of the obtained one or more time periods as the recommended presentation time for having the presentation on the selected exhibit.

8. The method of claim 1, further comprising:
   calculating an amount of additional charge fee to be charged to the exhibitor of the selected exhibit for having the presentation on the selected exhibit at the recommended presentation time based on the recommendation,
   wherein the presentation recommendation screen further includes the calculated amount of additional charge fee.

9. The method of claim 1, wherein the recommendation to have a presentation on the selected exhibit at the recommended presentation time includes one of 1) a recommendation to add a presentation on the selected exhibit at the recommended presentation time; and 2) a recommendation to change a presentation time of a presentation to be given on the selected exhibit to the recommended presentation time.

10. The method of claim 9, wherein, when the recommendation to add a presentation on the selected exhibit at the recommended presentation time is accepted, the method further comprises
obtaining a number of visitors who have attended the presentation that is given based on the recommendation; and
calculating an amount of additional charge fee to be charged to the exhibitor of the selected exhibit for having the presentation based on the recommendation, using the obtained number of visitors who have attended.

11. The method of claim 9, wherein, when the recommendation to change a presentation time of a presentation to be given on the selected exhibit to the recommended presentation time is accepted, the method further comprises
obtaining a number of visitors who have attended the presentation given at the recommended presentation time that is changed from a scheduled presentation time based on the recommendation;
obtaining a number of votes that have been collected during a time that is the same as the scheduled presentation time before the change; and
calculating an amount of additional charge fee to be charged to the exhibitor of the selected exhibit for giving the presentation based on the recommendation, based on a difference between the obtained number of visitors who have attended and the obtained number of votes.

12. The method of claim 1, wherein the selecting step comprises selecting the exhibit using the vote information, but only for those visitors, of the plurality of visitors, that are currently present at the exhibition, based on the visitor presence information.

13. A presentation management apparatus, comprising:
a memory to store presentation schedule information indicating, for each one of a plurality of presentations to be given at the exhibition, an exhibit to be presented and a presentation time for presenting the exhibit, wherein the exhibit includes a tag attached to the exhibit;
circuitry configured to:
analyze vote information, the vote information indicating, for each exhibit of the plurality of exhibits at the exhibition, a plurality of votes that has been electronically received for the exhibit from a plurality of visitors who has voted for the exhibit, each vote being input to a visitor terminal operated by each visitor by the visitor terminal reading the tag attached to the exhibit and transmitting information read from the tag to the presentation management apparatus;
analyze visitor presence information, the visitor presence information indicating whether each visitor who has voted for the exhibit is currently present at the exhibition:
select, from among the plurality of exhibits at the exhibition, a particular exhibit to be recommended for presentation based on analysis of the vote information, wherein the circuitry is further configured to select the exhibit to be recommended for presentation based on analysis of the vote information and the visitor presence information indicating whether each visitor who has voted for the exhibit is currently present at the exhibition;
determine a recommended presentation time for having a presentation on the selected exhibit based on the presentation schedule information; and
generate a presentation recommendation screen including a recommendation to have a presentation on the selected exhibit at the recommended presentation time; and
a transmitter to send the presentation recommendation screen to an exhibitor terminal operated by an exhibitor of the selected exhibit recommended for presentation for display on the exhibitor terminal,
wherein the circuitry is further configured to update the presentation schedule information stored in the memory to schedule the presentation on the selected exhibit at the recommended presentation time, based on a response from the exhibitor terminal indicating acceptance of the recommendation, and notify the updated presentation schedule information to the plurality of visitors by transmitting an electronic notification to each visitor terminal of the plurality of visitors for display on the visitor terminal.

14. The apparatus of claim 13, wherein the presentation schedule information further indicates, for each one of the plurality of presentations to be given at the exhibition, one of a plurality of exhibition places where the presentation is to be given, and
the circuitry is further configured to select one of the plurality of exhibition places that is not scheduled at the recommended presentation time based on the presentation schedule information, as an exhibition place to be used for having the presentation on the selected exhibit at the recommended presentation time, the presentation recommendation screen further including the selected exhibition place.

15. The apparatus of claim 13, wherein the recommendation to have a presentation on the selected exhibit at the recommended presentation time includes one of 1) a recommendation to add a presentation on the selected exhibit at the recommended presentation time; and 2) a recommendation to change a presentation time of a presentation to be given on the selected exhibit to the recommended presentation time.

16. A presentation management system, comprising:
a memory to store presentation schedule information indicating, for each one of a plurality of presentations to be given at the exhibition, an exhibit to be presented and a presentation time for presenting the exhibit, wherein the exhibit includes a tag attached to the exhibit;
first processing circuitry configured to
analyze vote information, the vote information indicating, for each exhibit of the plurality of exhibits at the exhibition, a plurality of votes that has been electronically received for the exhibit from a plurality of visitors who has voted for the exhibit, each vote being input to a visitor terminal operated by each visitor by the visitor terminal reading the tag attached to the exhibit and transmitting information read from the tag to the first processing circuitry;
analyze visitor presence information, the visitor presence information indicating whether each visitor who has voted for the exhibit is currently present at the exhibition;

select, from among the plurality of exhibits at the exhibition, a particular exhibit to be recommended for presentation based on analysis of the vote information, wherein the first circuitry is further configured to select the exhibit to be recommended for presentation based on analysis of the vote information and the visitor presence information indicating whether each visitor who has voted for the exhibit is currently present at the exhibition; and determine a recommended presentation time for having a presentation on the selected exhibit based on the presentation schedule information; and second processing circuitry configured to generate a presentation recommendation screen including a recommendation to have a presentation on the selected exhibit at the recommended presentation time, transmit the presentation recommendation screen to an exhibitor terminal operated by an exhibitor of the selected exhibit recommended for presentation for display on the exhibitor terminal, update the presentation schedule information stored in the memory to schedule the presentation on the selected exhibit at the recommended presentation time, based on a response from the exhibitor terminal indicating acceptance of the recommendation, and notify the updated presentation schedule information to the plurality of visitors by transmitting an electronic notification to each visitor terminal of the plurality of visitors for display on the visitor terminal.

17. The presentation management system of claim 16, wherein the presentation schedule information further indicates, for each one of the plurality of presentations to be given at the exhibition, one of a plurality of exhibition places where the presentation is to be given, the first processing circuitry is further configured to select one of the plurality of exhibition places that is not scheduled at the recommended presentation time based on the presentation schedule information, as an exhibition place to be used for having the presentation on the selected exhibit at the recommended presentation time, and the second processing circuitry is further configured to display the selected exhibition place on the presentation recommendation screen.

\* \* \* \* \*